(12) United States Patent
Linville et al.

(10) Patent No.: US 11,860,572 B2
(45) Date of Patent: *Jan. 2, 2024

(54) DISPLAYING HOLOGRAMS VIA HAND LOCATION

(71) Applicant: Microsoft Technology Licensing, LLC, Redmond, WA (US)

(72) Inventors: Addison Kenan Linville, Kenmore, WA (US); Jarod Wayne Lenz Erwin, Snoqualmie, WA (US); Dong Yoon Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,791

(22) Filed: Nov. 15, 2022

(65) Prior Publication Data
US 2023/0075560 A1    Mar. 9, 2023

Related U.S. Application Data

(63) Continuation of application No. 16/391,048, filed on Apr. 22, 2019, now Pat. No. 11,507,019.

(60) Provisional application No. 62/809,627, filed on Feb. 23, 2019.

(51) Int. Cl.
*G03H 1/02* (2006.01)
*G03H 1/00* (2006.01)
*G03H 1/22* (2006.01)
*G06F 3/01* (2006.01)
(Continued)

(52) U.S. Cl.
CPC ......... *G03H 1/0248* (2013.01); *G03H 1/0005* (2013.01); *G03H 1/2249* (2013.01); *G06F 3/011* (2013.01); *G06F 3/017* (2013.01); *G06F 3/0484* (2013.01); *G06T 19/006* (2013.01); *G03H 2001/0204* (2013.01); *G03H 2001/226* (2013.01)

(58) Field of Classification Search
CPC .. G03H 1/0248; G03H 1/0005; G03H 1/2249; G03H 2001/0204; G03H 2001/226; G06F 3/011; G06F 3/017; G06F 3/0484; G06T 19/006
See application file for complete search history.

(56) References Cited

U.S. PATENT DOCUMENTS 10,607,413 B1 * 3/2020 Marcolina ............... G06F 3/012
11,079,995 B1 * 8/2021 Hulbert ................ G06F 3/0485
11,089,134 B1 * 8/2021 Gordon ................ H04W 4/023
(Continued)

*Primary Examiner* — Yu Chen
(74) *Attorney, Agent, or Firm* — Alleman Hall Creasman & Tuttle LLP

(57) ABSTRACT

Examples are disclosed that relate to computing devices, head-mounted display devices, and methods for displaying holographic objects using slicing planes or volumes. In one example a computing device causes a display system to display a holographic object associated with a holographic volume, the holographic object occluding an occluded holographic object that is not displayed. Location data of at least a portion of a hand is received from a sensor. The location data of the hand is used to locate a slicing plane or a slicing volume within the holographic volume. Based on the location of the slicing plane or the slicing volume, at least a portion of the occluded holographic object is displayed via the display system.

20 Claims, 22 Drawing Sheets

(51) Int. Cl.
*G06F 3/0484* (2022.01)
*G06T 19/00* (2011.01)

(56) References Cited

U.S. PATENT DOCUMENTS

| | | | |
|---|---|---|---|
| 2012/0086719 A1* | 4/2012 | Brown | G06T 19/20 |
| | | | 345/582 |
| 2013/0104087 A1* | 4/2013 | Mlyniec | G06F 3/04815 |
| | | | 715/849 |
| 2015/0067601 A1* | 3/2015 | Bernstein | G06F 3/0412 |
| | | | 715/823 |
| 2016/0147308 A1* | 5/2016 | Gelman | G06F 3/04845 |
| | | | 345/156 |
| 2016/0210781 A1* | 7/2016 | Thomas | G06F 3/017 |
| 2016/0225192 A1* | 8/2016 | Jones | A61B 34/20 |
| 2016/0239080 A1* | 8/2016 | Marcolina | G06F 1/163 |
| 2019/0362557 A1* | 11/2019 | Lacey | G06F 3/167 |
| 2019/0362562 A1* | 11/2019 | Benson | G06F 3/0304 |
| 2020/0033951 A1* | 1/2020 | Horowitz | G06T 19/006 |
| 2020/0097071 A1* | 3/2020 | Johnston | G02B 27/0176 |
| 2020/0320793 A1* | 10/2020 | Marcolina | G06T 19/006 |

\* cited by examiner

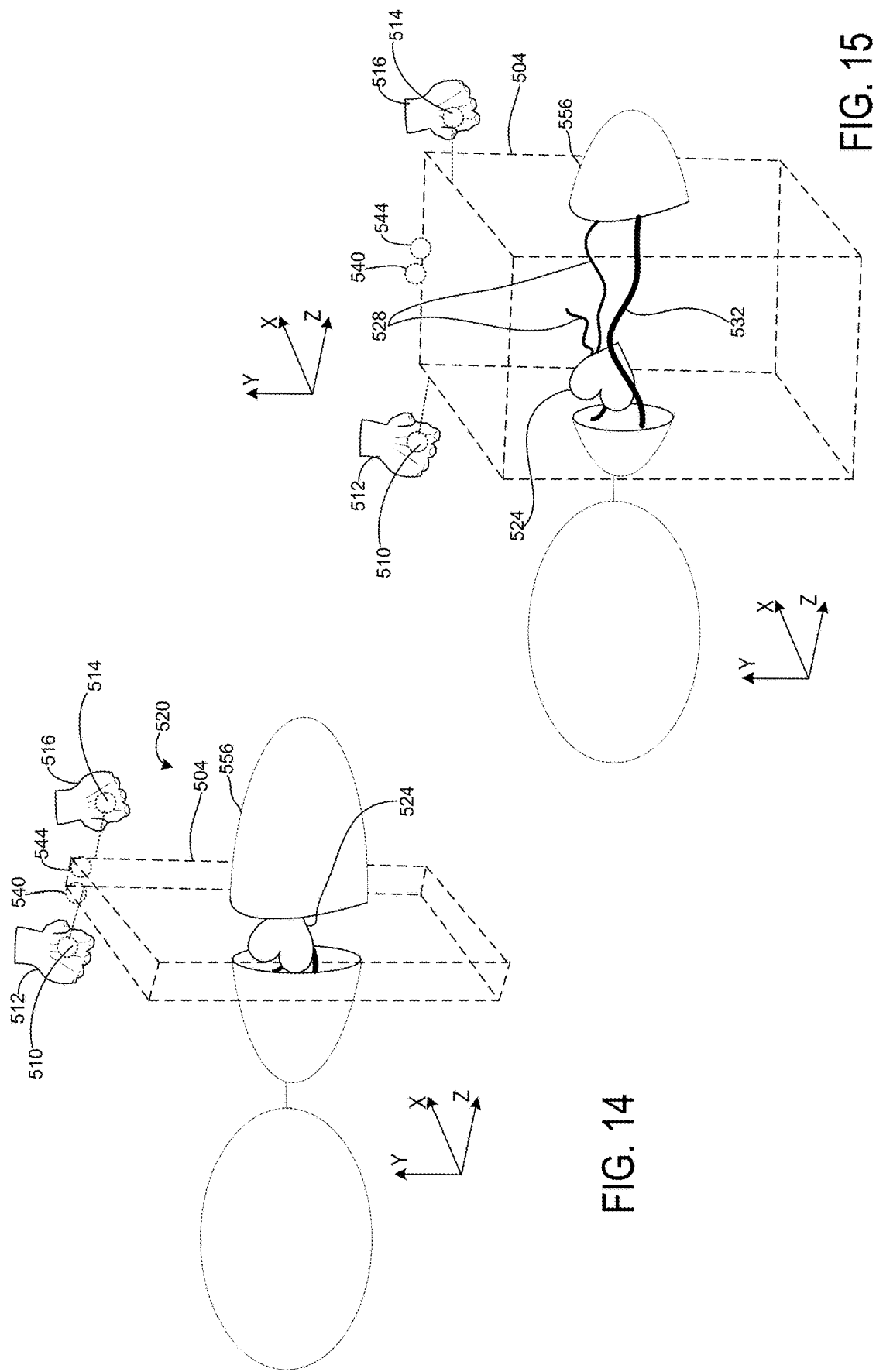

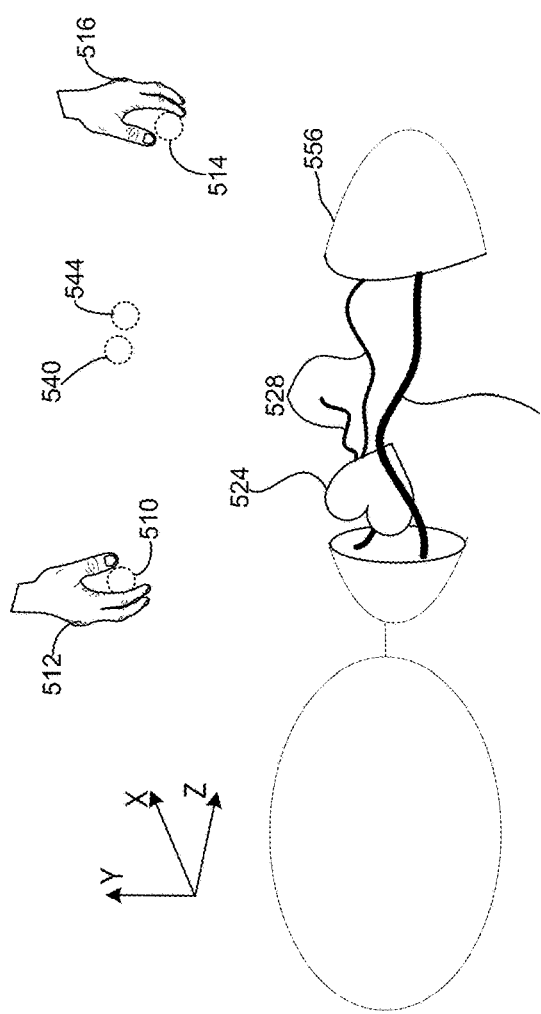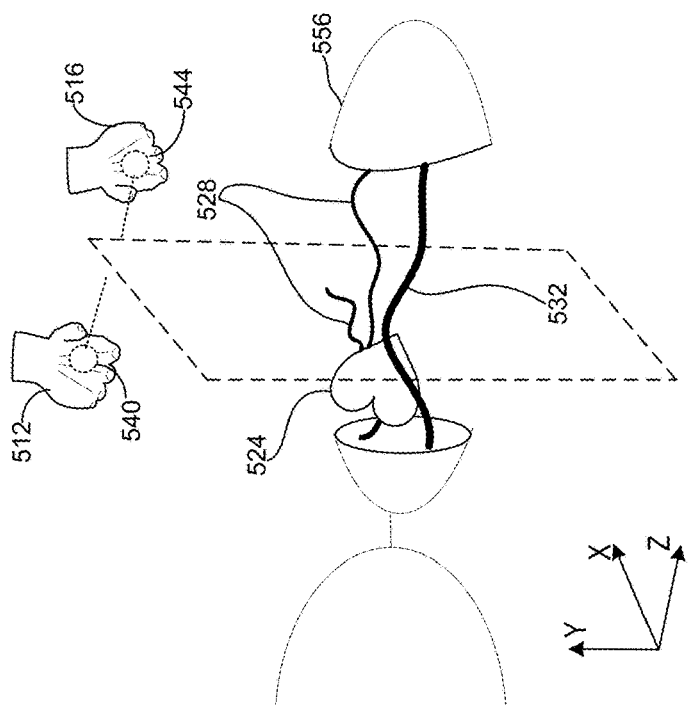

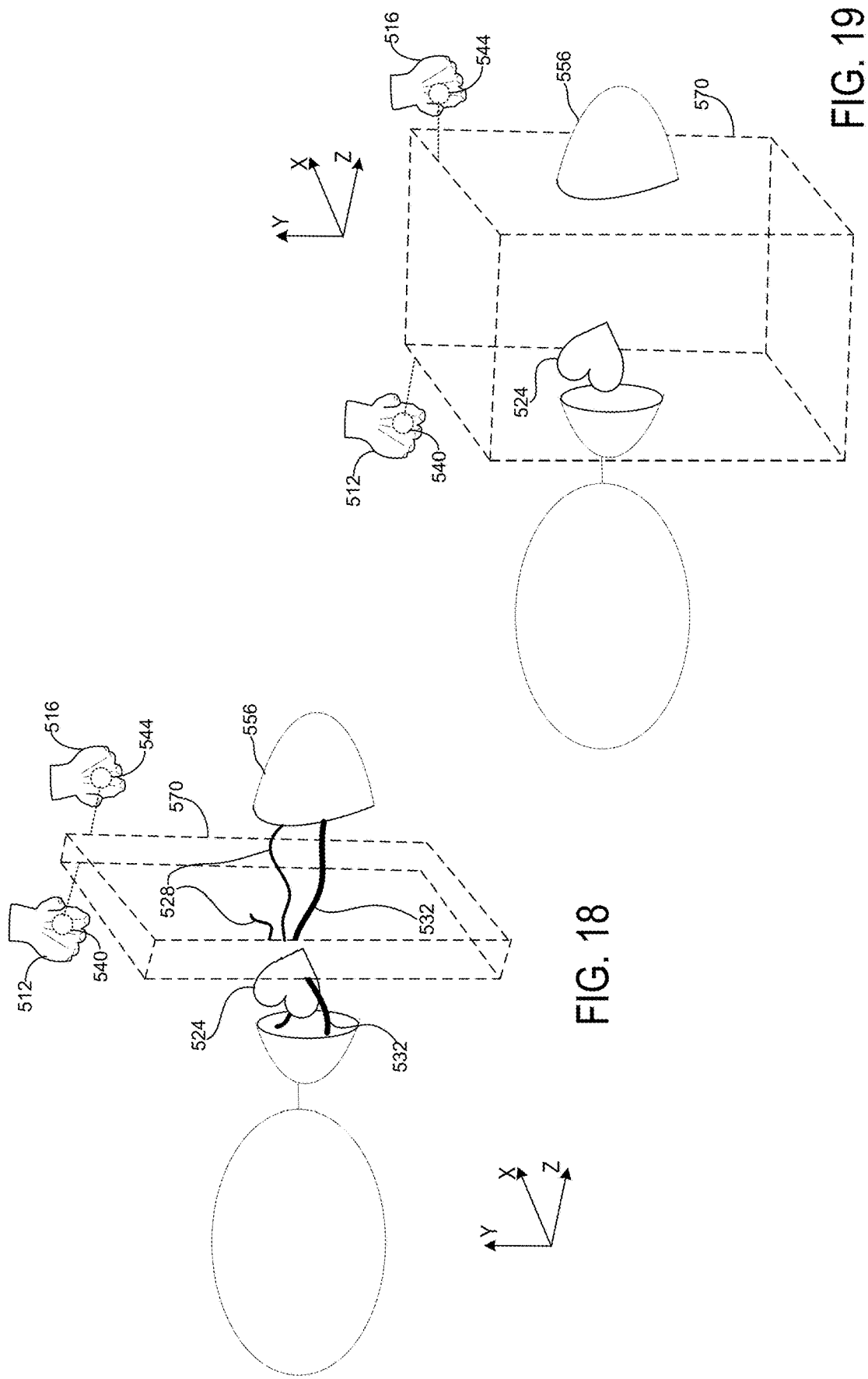

DISPLAYING HOLOGRAMS VIA HAND LOCATION

CROSS REFERENCE TO RELATED APPLICATIONS

This application is a continuation of U.S. Non-Provisional application Ser. No. 16/391,048, filed Apr. 22, 2019, which claims priority to U.S. Provisional patent application Ser. No. 62/809,627, filed Feb. 23, 2019, and entitled "DISPLAYING HOLOGRAMS VIA HAND LOCATION," the entirety of each of which is hereby incorporated herein by reference for all purposes.

BACKGROUND

Some display systems are configured to display virtual imagery as admixed with a real-world background, for example via a see-through display system or via augmentation of a video image of the real-world background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to displaying holographic objects using slicing planes or volumes. In one example a computing device causes a display system to display a holographic object associated with a holographic volume, the holographic object occluding an occluded holographic object that is not displayed. Location data of at least a portion of a hand is received from a sensor. The location data of the hand is used to locate a slicing plane or a slicing volume within the holographic volume. Based on the location of the slicing plane or the slicing volume, at least a portion of the occluded holographic object is displayed via the display system.

BRIEF DESCRIPTION OF THE DRAWINGS

FIGS. 12-19 show examples of utilizing two hands to manipulate two slicing planes that define a slicing volume within a holographic volume according to examples of the present disclosure.

DETAILED DESCRIPTION

Figure 1:
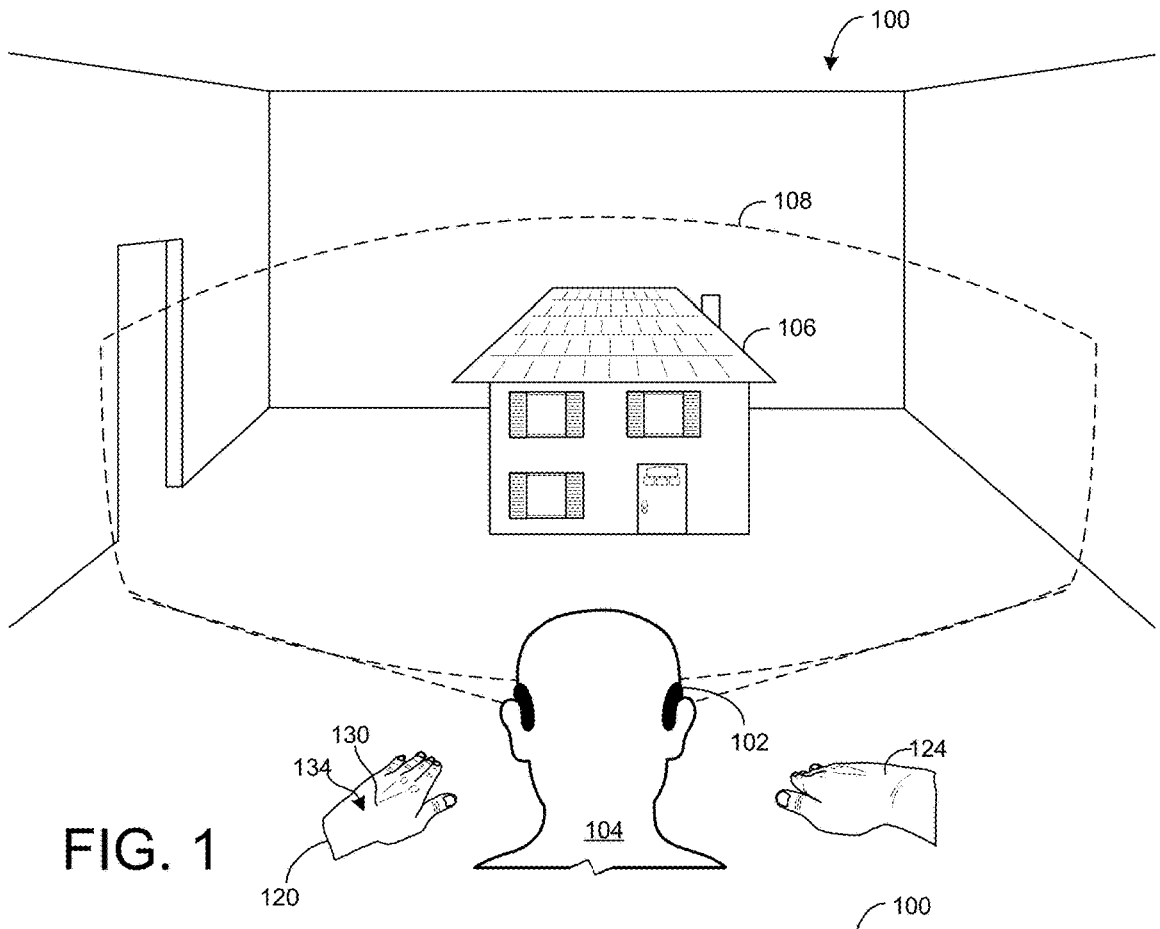
FIG. 1 is an example use case environment showing diagram an HMD device displaying a holographic object according to examples of the present disclosure.

An augmented or virtual reality system, such as a head-mounted display (HMD), may permit a user to interact with a variety of displayed holographic objects. In some examples, one or more holographic objects may occupy a volume of space. For example and with reference to the example use environment 100 shown in FIG. 1, a user 104 wears a head-mounted display (HMD) device in the form of an augmented reality display system 102. The augmented reality display system 102 displays virtual imagery to the user 104 via a see-through display system such that at least a portion of a real-world background is viewable concurrently with the displayed virtual imagery. While described in the context of an augmented reality display system and the use of a see-through display, it will be understood that examples described herein also may be enacted via a virtual reality display system or a video augmented reality display system in which a video image of a physical environment is obtained by a camera and then augmented with virtual image data when displayed to a user of the system.

In this example, the HMD 102 displays a three-dimensional holographic volume in the form of a virtual house 106 displayed within the field of view 108 of the augmented reality display system 102. Additional holographic objects may be located inside the volume of the virtual house 106. These objects are occluded from view by the HMD 102 such that the user 104 sees only exterior elements of the house (roof, walls, etc.). In some systems, if the user desires to view holographic objects located inside the house, they first must find an "edit mode" in their display system, select a separate control feature, and then manipulate the control feature to change their view. Such a control feature interposes a mediating interface between the user's actual input and the user's ability to change the view of occluded objects inside the house. For example, the user may be required to operate an editing affordance via digital manipulation, speech command, gaze direction, head direction, button press, or other manipulation, to change their view of the house. This approach is slow, highly precise, and requires indirect manipulation by the user.

Accordingly, examples of interaction modes are disclosed that relate to viewing inside a holographic volume in a potentially more natural, intuitive, and efficient manner. Briefly and as described in more detail below, in some examples a user of a display system may reveal holographic objects located within a holographic volume by simply moving one or both hands of the user. In some examples, location data of at least a portion of a hand is received from a sensor. Based on the location data, a change in location of the hand relative to the holographic volume is determined. Based at least on the change in location of the hand relative to the holographic volume, one or more occluded holographic objects associated with the holographic volume, which were previously occluded from view, are displayed via the display system.

As used herein, in some examples location and location data may comprise 3 degree-of-freedom location/data (such as position or orientation information relative to 3 orthogonal axes). In some examples, location and location data may comprise 6 degree-of-freedom location/data, including position information along 3 perpendicular axes and changes in orientation through rotation about the three perpendicular axes (yaw, pitch and roll).

In some examples and as described in more detail below, using articulated hand location data obtained from a sensor, a slicing plane is defined along an axis that is aligned with the backside of the user's palm of a hand. On one side of the slicing plane, holographic objects within the holographic volume are displayed, while on the other side of the slicing plane other holographic objects within the volume are not displayed to the user. As the user moves her hand the slicing plane is correspondingly relocated, and holographic objects within the volume are correspondingly displayed or occluded. In this manner, the slicing plane may provide a "flashlight" experience in which the user may easily and selectively reveal previously occluded holographic objects within the volume.

In some examples, both hands of the user may each define a slicing plane. In some examples, the plane is defined along an axis that is aligned with the palm of the user's hand. When the user's palms at least partially face each other, the slicing planes may define a sub-volume within the holographic volume in which holographic objects are displayed, and outside of which holographic objects are occluded. This can create an experience of the user "holding" and dynamically resizing a volume of space between the user's hands in which holographic objects within the volume are revealed.

In some examples, both hands of the user may define a sub-volume (spherical, oblong, polyhedral, or other shape) between the hands within the holographic volume in which holographic objects are displayed, and outside of which holographic objects are occluded. This can create an experience of the user "holding" and dynamically resizing a "beach ball", "football" or other portion of space between the user's hands in which holographic objects within the volume are revealed.

Figure 2:
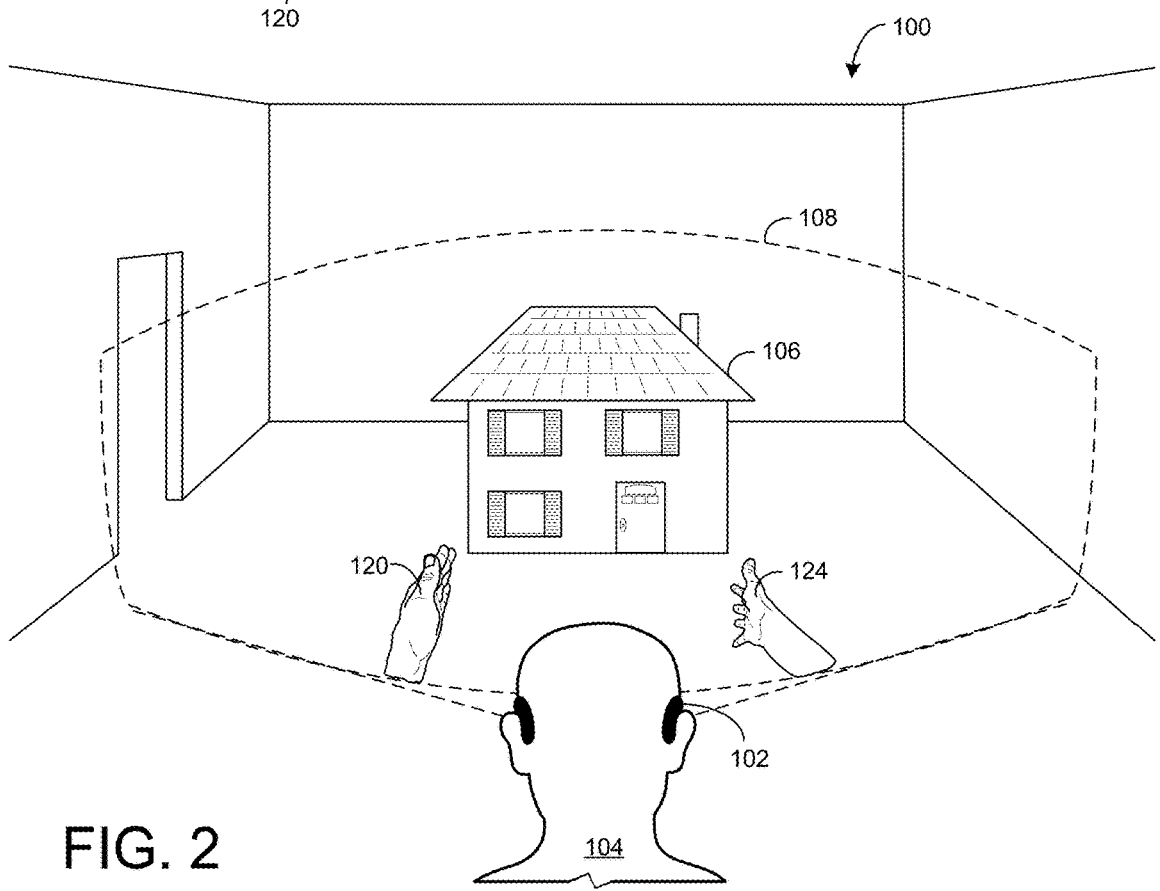
FIG. 2 shows the use case environment of FIG. 1 with the user's hands extended into the field of view of the HMD device according to examples of the present disclosure.

As a more specific example and with reference to FIG. 2, in an augmented-reality scenario, user 104 may view the holographic house 106 and other holographic objects located within the house (occluded from view in FIG. 2) in a stationary frame of reference for the real-world. The term "stationary frame of reference" indicates that the house is fixed in position relative to the real-world as a user moves through the use environment 100. The house and the internally-located objects are displayed in the real-world using a coordinate location (e.g. Cartesian coordinates) within a coordinate system of the stationary frame of reference. As described in more detail in the examples below, the user 104 orients one or both hands 120, 124 to be within the field of view 108 of the augmented reality display system 102. In some examples, moving one or both hands 120, 124 to be within the field of view 108 triggers an interaction mode that enables the user to reveal holographic objects located within the holographic volume by simply moving one or both hands 120, 124.

In some examples, the user may trigger an interaction mode as described herein by penetrating the holographic volume of house 106 with one or both hands 120, 124. In other examples, the interaction mode may be triggered in any suitable manner, such as via verbal command, button press, etc.

As mentioned above and as described in more detail below, in some examples the augmented reality display system 102 uses one or more sensors to capture depth image data of the real-world use environment 100 and detects, via the depth image data, an appendage (hand 120, 124) of the user 104. Such image data may represent articulated hand image data that represents multiple joints, lengths, and/or surfaces of the hand. In this manner, the system may track the location of one or more joints, lengths, surfaces, and digits of the hand and/or planes defined by the hand. In some examples, the augmented reality display system 102 may fit a skeletal model to each image in a series of depth images, and apply one or more gesture filters to detect whether the user has performed a recognized gesture. In other examples, the augmented reality display system 102 may received depth image data and/or other image data from one or more cameras external to the display system.

Figure 3:
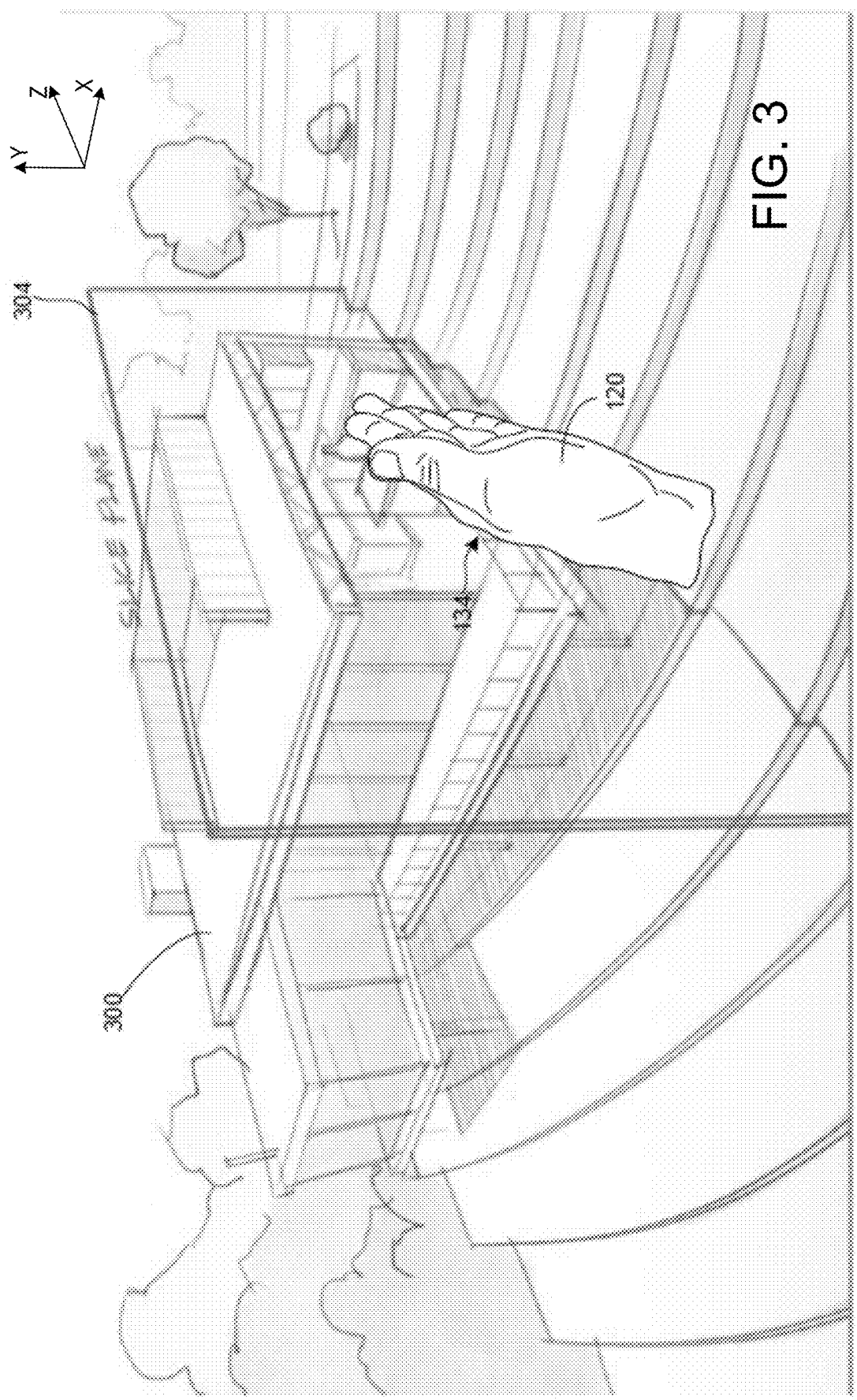
FIG. 3 shows an example of utilizing one hand to manipulate a slicing plane within a holographic volume according to examples of the present disclosure.

With reference now to FIG. 3, in this example the left hand 120 of user 104 is within the field of view of HMD 102. A holographic volume in the form of another house 300 is displayed via the HMD. The HMD 102 receives location data of the hand 120 that may include a backside point location 130 on the upper portion 134 of the user's hand opposite to the palm side (see also FIG. 1) and one or more other locations of the hand. Using such location data, a slice plane 304 may be defined that is substantially parallel to the surface of the upper portion 134 of the hand. As described in more detail below, the user may conveniently and naturally move hand 120 to correspondingly move the slicing plane 304 through the house 300 to selectively reveal and occlude from view other holographic objects located within the volume of house 300.

In the example of FIG. 3, an affordance of the slicing plane 304 is displayed via the HMD 102 to enable the user to more clearly perceive the current location of the plane. In this example, the affordance comprises a translucent pane that defines the boundaries of the slicing plane. In other examples, other suitable affordances (such as a simple rectangle, glowing outline, etc.) may be displayed. In other examples, an affordance of the slicing plane 304 may not be displayed.

In some examples, the slicing plane 304 may be "snapped" to align with one or more of a closest axis of the holographic volume. In the example of FIG. 3, the upper portion 134 of hand 120 is most closely aligned with the Y-Z plane of the three mutually orthogonal coordinate planes. Accordingly, the slicing plane 304 is snapped to align with the Y-Z plane. In this example, the X-Y-Z axis and corresponding three orthogonal planes are determined with respect to the surfaces of the holographic house 300. In other examples the coordinate axis and corresponding orthogonal planes may be determined and set in any suitable manner.

In some examples and as described below, the slicing plane 304 may be locked to the closest axis to which it is snapped. In this manner, the user may freely move her hand within the volume, including rotating her hand about such axis, while the slicing plane remains constrained to move along a single axis. In the example of FIG. 3, when the slicing plane 304 is snapped to the Y-Z axis, the user may move the slicing plane laterally along the X-axis to conveniently reveal and occlude other holographic objects within the house 300. In this manner, the system maintains alignment of the slicing plane with the closest coordinate plane during movement of the hand.

In other examples and as described below, a slicing plane may be free to move about all three axes from 0-360 degrees, and thereby follow the orientation of the upper portion 304 of the user's hand.

In the example of FIG. 3, the slicing plane 304 selectively reveals holographic objects that are located behind the upper portion 134 of the hand (e.g., rearward in the negative X-axis direction). In this example, the slicing plane 304 may operate like a "flashlight" to reveal previously hidden or occluded holographic objects located in a predetermined revealing direction relative to the plane—in this example, in the negative X-axis direction relative to the plane. In other examples, other revealing directions may be utilized, such as in the positive X-axis direction relative to the plane.

Figure 4:
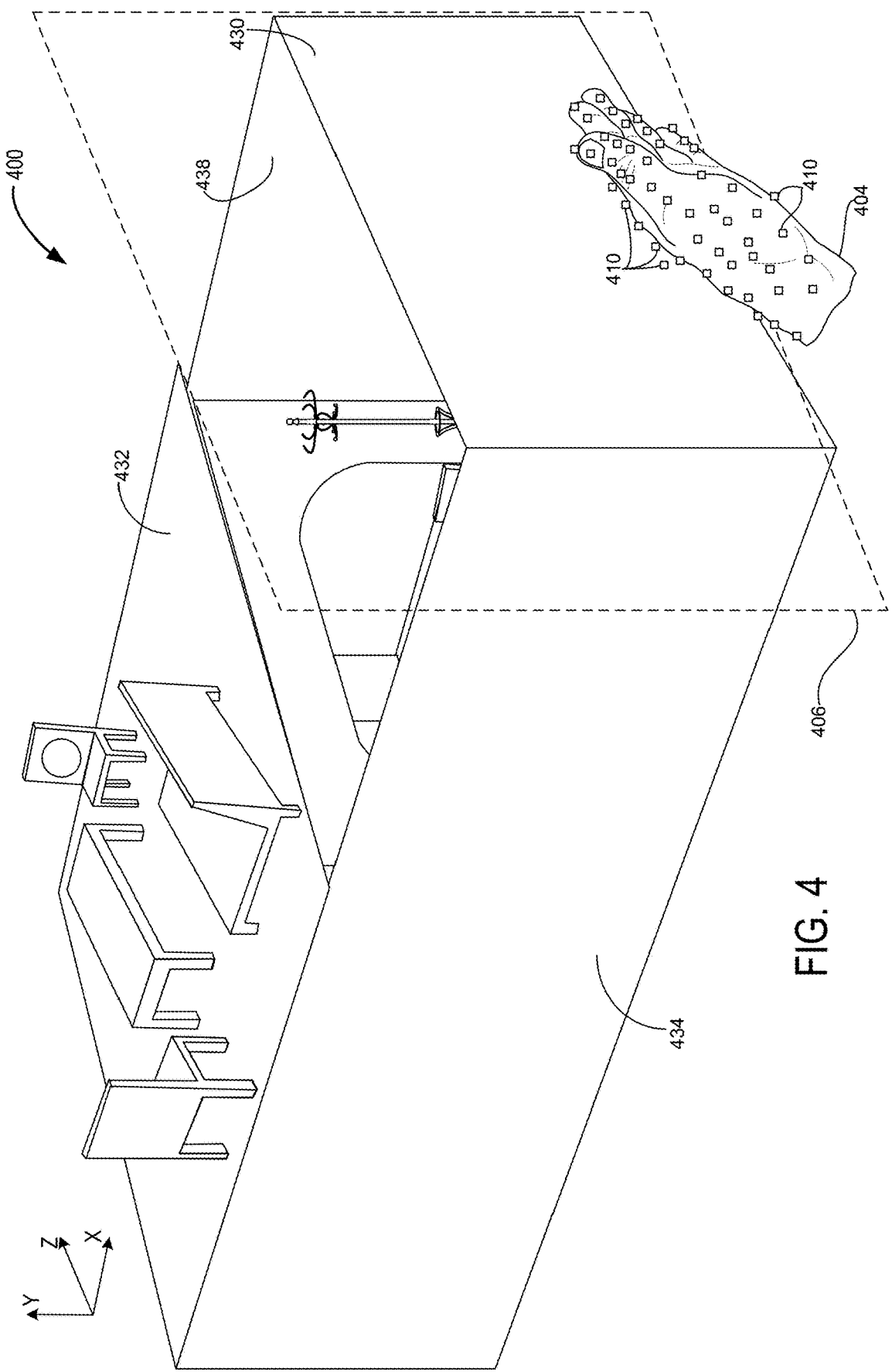
FIGS. 4-7 show examples of utilizing one hand to manipulate a slicing plane within a holographic volume according to examples of the present disclosure.

With reference now to FIGS. 4-7, another example of utilizing one hand to manipulate a slicing plane within a holographic volume is provided. These figures show the user's view through the see-through display of an augmented reality device, such as HMD 102. As shown in FIG. 4, a holographic volume in the form of a house model 400 is displayed via HMD 102 to a user. The house model 400 comprises a plurality of holographic objects, including structural features (floors, ceilings, walls, etc.) and furnishing features not visible in this view (tables and chairs, a couch, bookshelf, sink, etc.). In the view shown in FIG. 4, the user's left hand 404 and the corresponding slicing plane 406 have not penetrated the holographic volume of house model 400. Accordingly, certain holographic objects (a table and chairs, couch, bookshelf, sink) internal to the house are occluded from view by other objects (walls, ceilings) and are not displayed. In this example, the user sees his hand 404 through the see-through display of HMD 102. Additionally, in this example a hand affordance is displayed to the user in the form of multiple blocks 410 that indicate a location of a particular joint or other feature of his hand. Other examples of affordances that may be displayed to indicate hand 404 include glowing outlines, colored overlays, etc. In other examples, a hand affordance may not be displayed.

Figure 5:
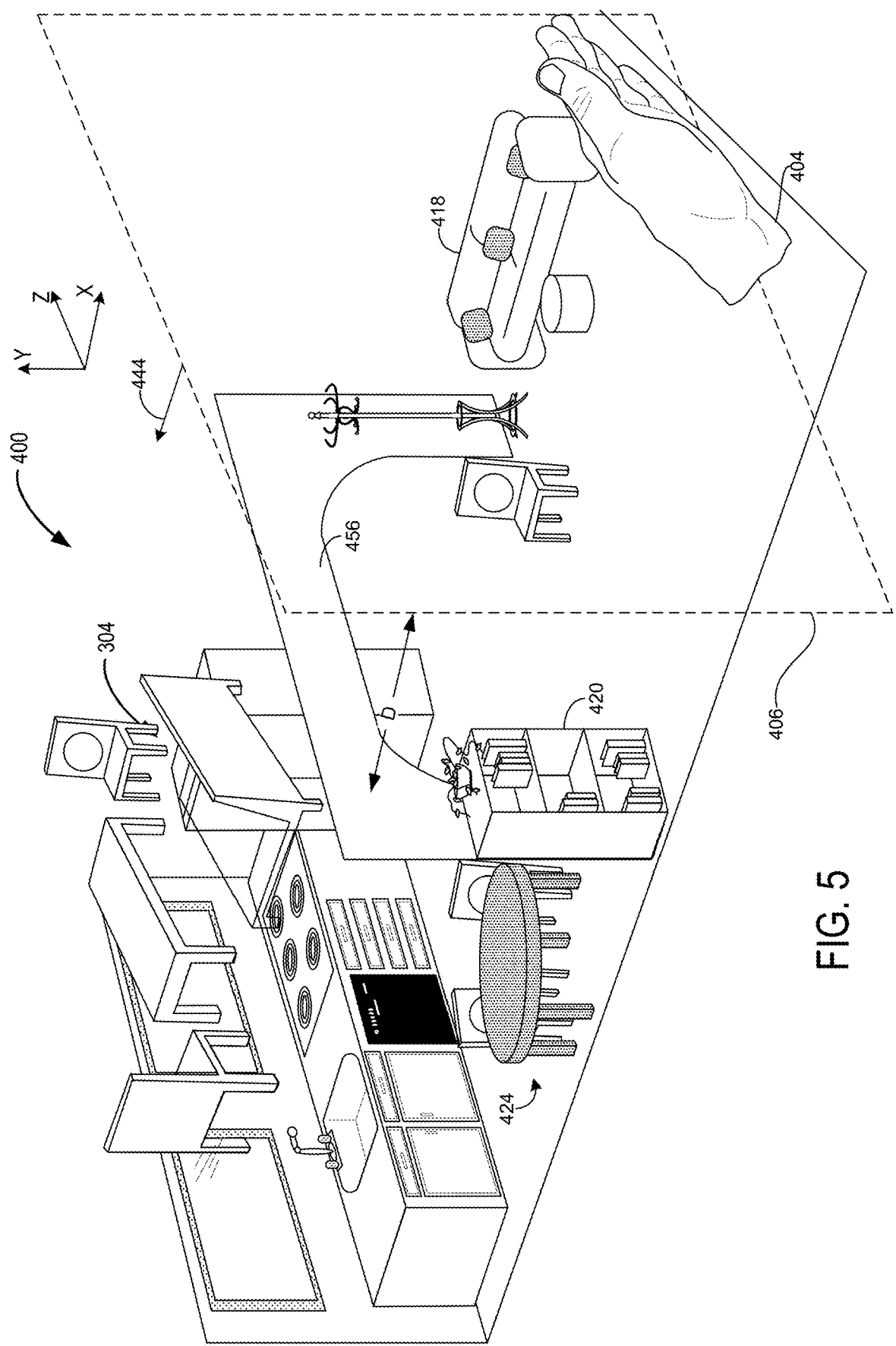

As shown in FIG. 5, as the user move his hand 404 in the negative X-axis direction toward the house model 400, when the hand and slicing plane 406 penetrate the volume of the house model 400, previously occluded holographic objects within the volume, such as sofa 418, bookcase 420, and table and chairs 424, are revealed and displayed, while other previously displayed objects (front wall 430, first side wall 434, second side wall 438, and ceiling 442 (see FIG. 4)) are not displayed.

Figure 6:
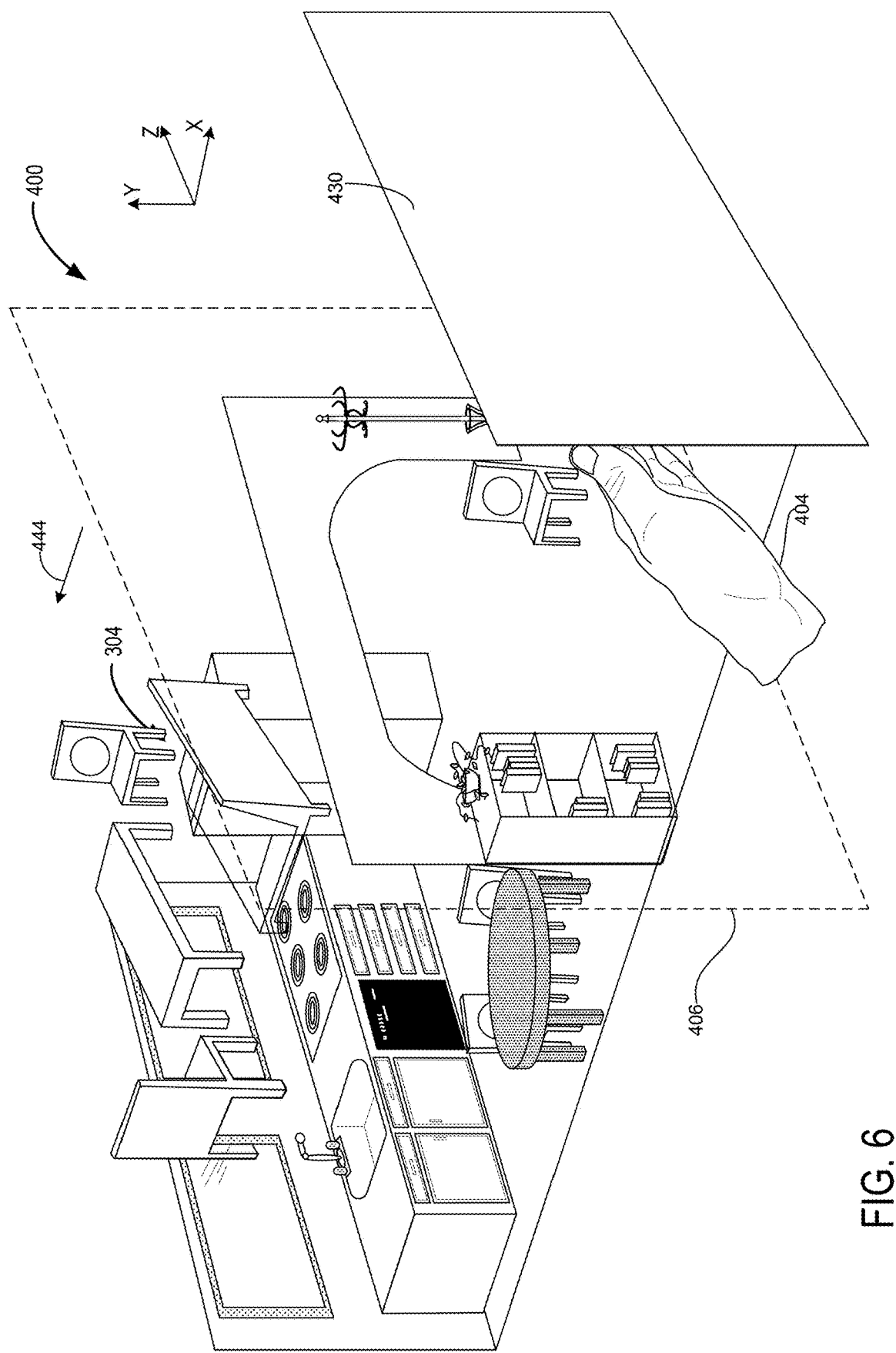

In this example and as described above, the upper portion of hand 404 is most closely aligned with the Y-Z plane, and thus the slicing plane 406 is snapped to align with the Y-Z plane. In this example, the slicing plane is also locked to the Y-Z plane. Also in this example, the revealing direction relative to slicing plane, indicated at 444, is the negative X-axis direction. Accordingly and as shown in FIGS. 5 and 6, previously occluded holographic objects (not visible in FIG. 4) that are located in the negative X-axis direction from the upper portion of hand 404 are revealed and displayed. In this manner, the user can conveniently scan through the house model 400 with just one hand to selectively reveal and display internal holographic objects. Also in this example, as the hand 404 moves rearward in the negative X-axis direction, certain holographic objects located in the positive X-axis direction from the palm are once again occluded from view by other objects and are not displayed. For example, in FIG. 6 the sofa 418 shown in FIG. 5 is now occluded by the front wall 430.

Figure 7:
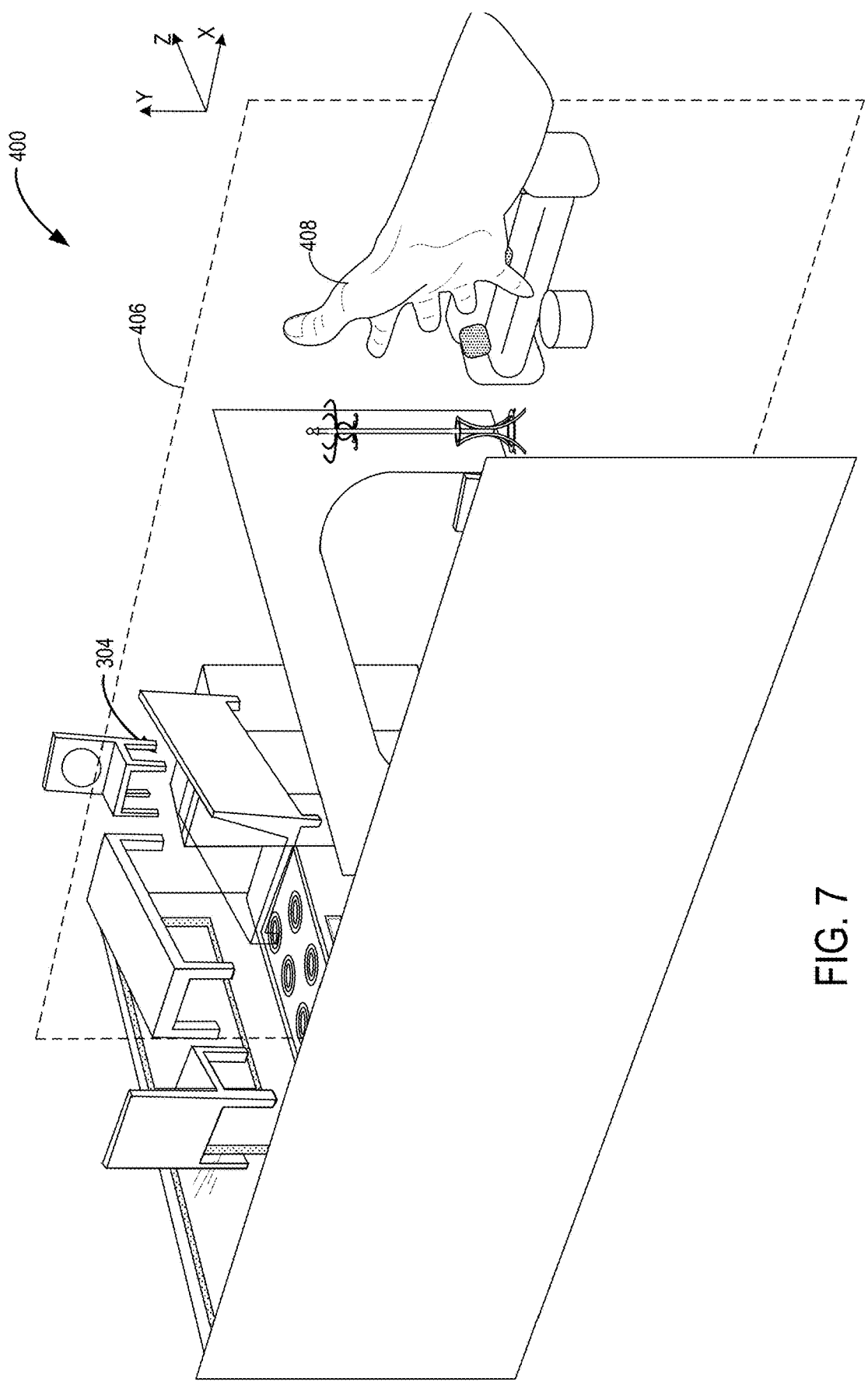

FIG. 7 shows an example of the user's right hand 408 oriented such that the upper portion of the hand is aligned with the X-Y plane. Accordingly, previously occluded holographic objects that are located in the positive Z-axis direction from the upper portion of hand 408 are now revealed and displayed.

With reference now to FIGS. 8-11, in some examples two hands may be utilized to manipulate two slicing planes within a holographic volume. In some examples, each slicing plane corresponding to each hand may be operated as described above for FIGS. 4-7. In some examples, the revealing direction may be reversed as compared to the examples illustrated in FIGS. 4-7, such that previously occluded holographic objects that are located in front of the palm of each hand are revealed and displayed.

Figure 8:
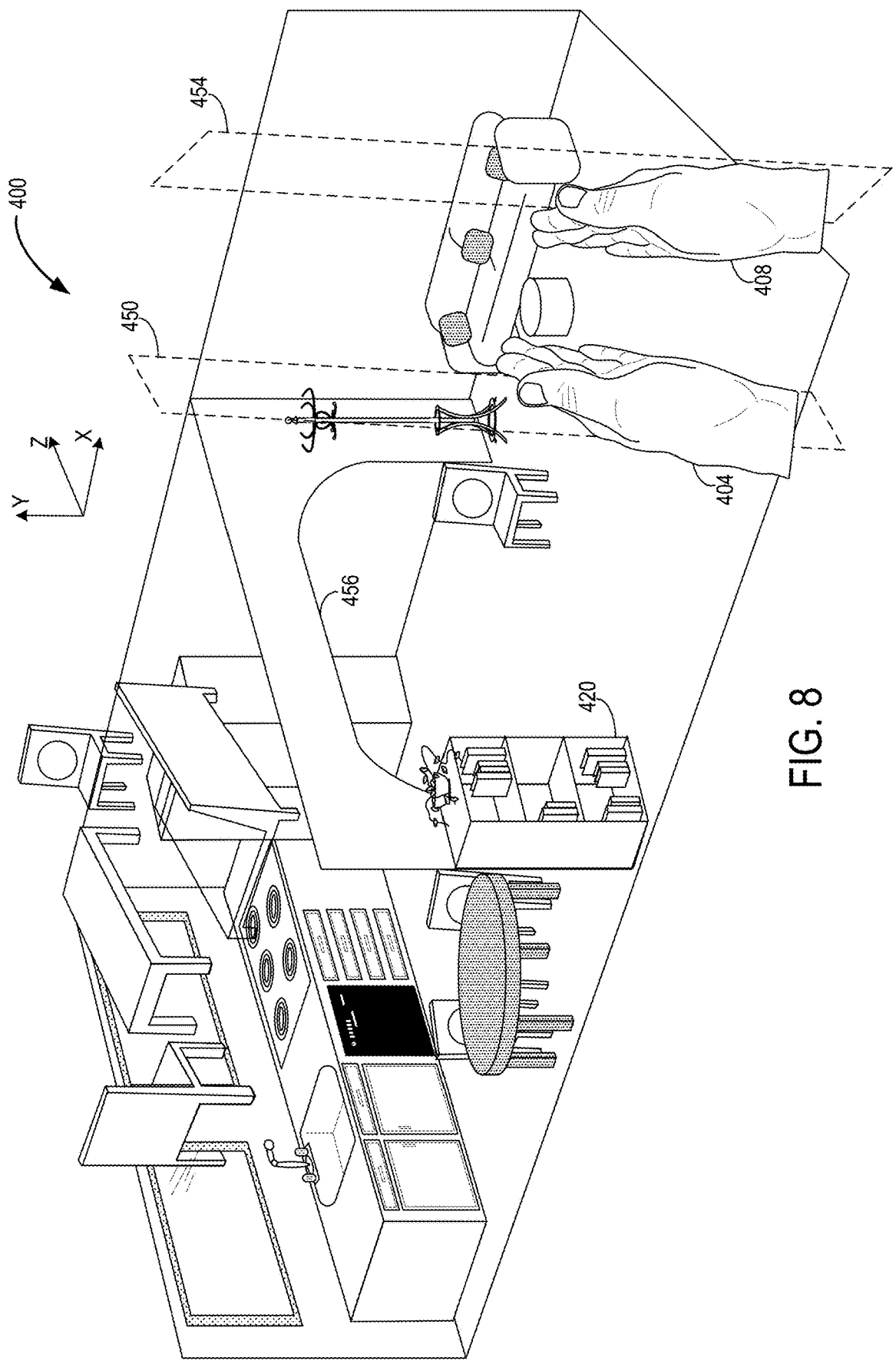
FIGS. 8-11 show examples of utilizing two hands to manipulate two slicing planes within a holographic volume according to examples of the present disclosure.
Figure 9:
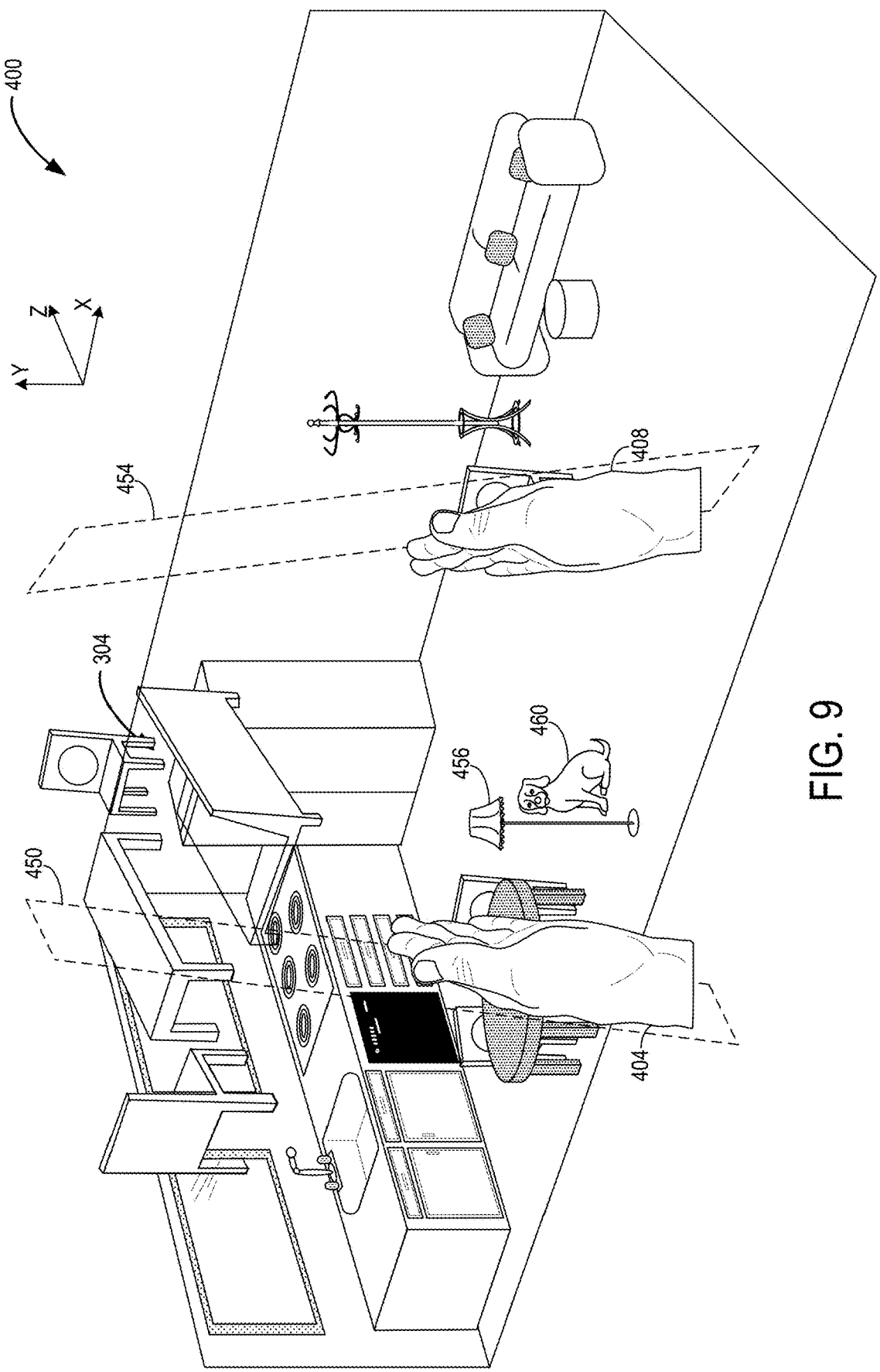

As illustrated in FIGS. 8 and 9, when the user inserts his two hands 404, 408 into the house model 400, slicing planes 450 and 454 parallel to the upper portions of the left hand 404 and right hand 408, respectively, are generated and operate to reveal previously occluded holographic objects that are located between the slicing planes (between the user's hands). For example and with reference to FIG. 9, by positioning his hands 404, 408 as shown, the user causes the system to cease displaying the interior wall 456 and bookcase 420 shown in FIG. 8, which corresponding reveals and causes the system to display the holographic lamp 456 and dog 460 that had been located behind and occluded by the wall and bookcase. Additionally and in this example, the slicing planes 450, 454 are maintained substantially parallel with the upper surfaces of the corresponding hands during movement of the hands. In some examples, one or more of the slicing planes may be aligned or substantially aligned parallel with the surface of the user's palm.

Figure 10:
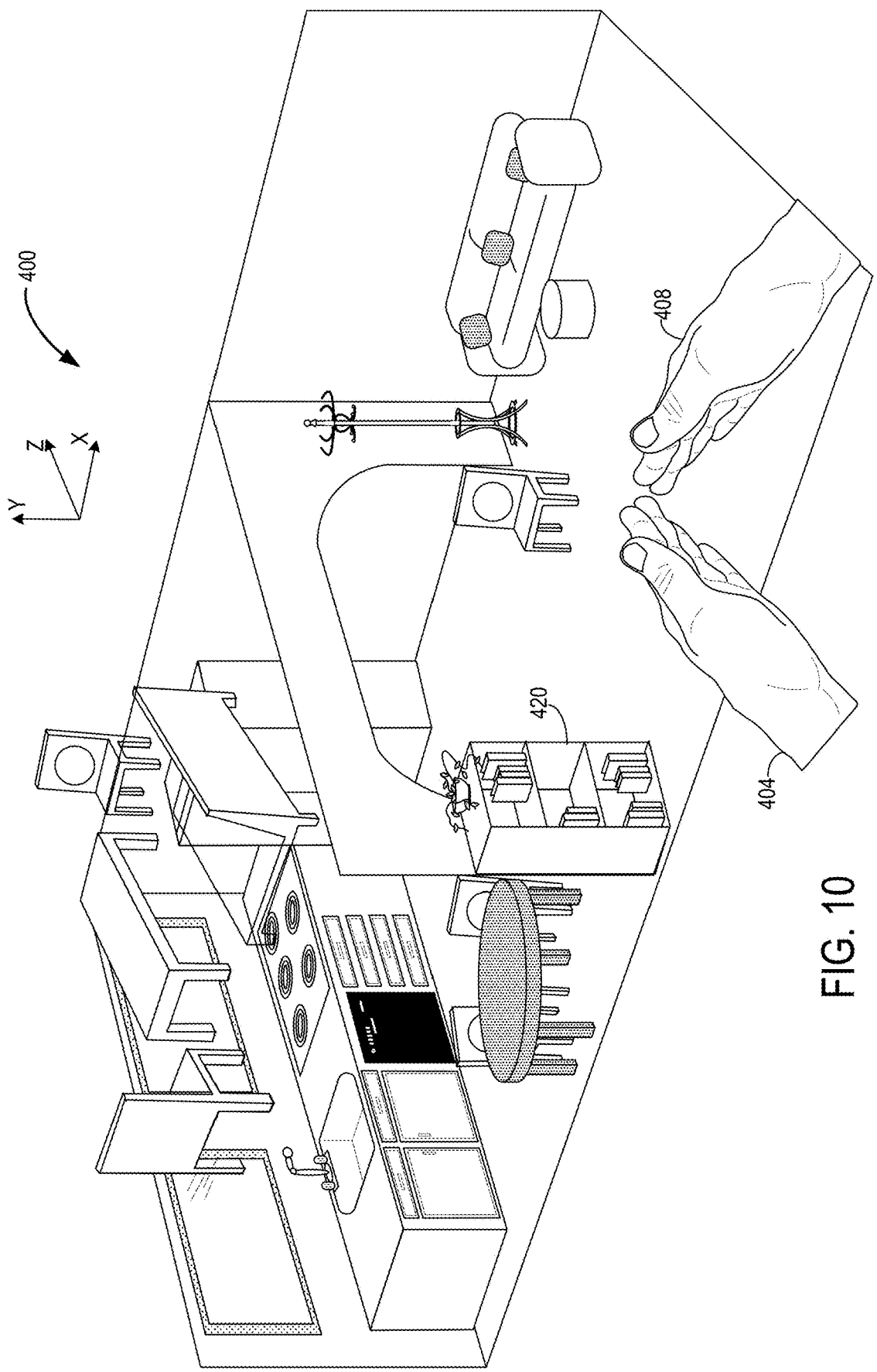
Figure 11:
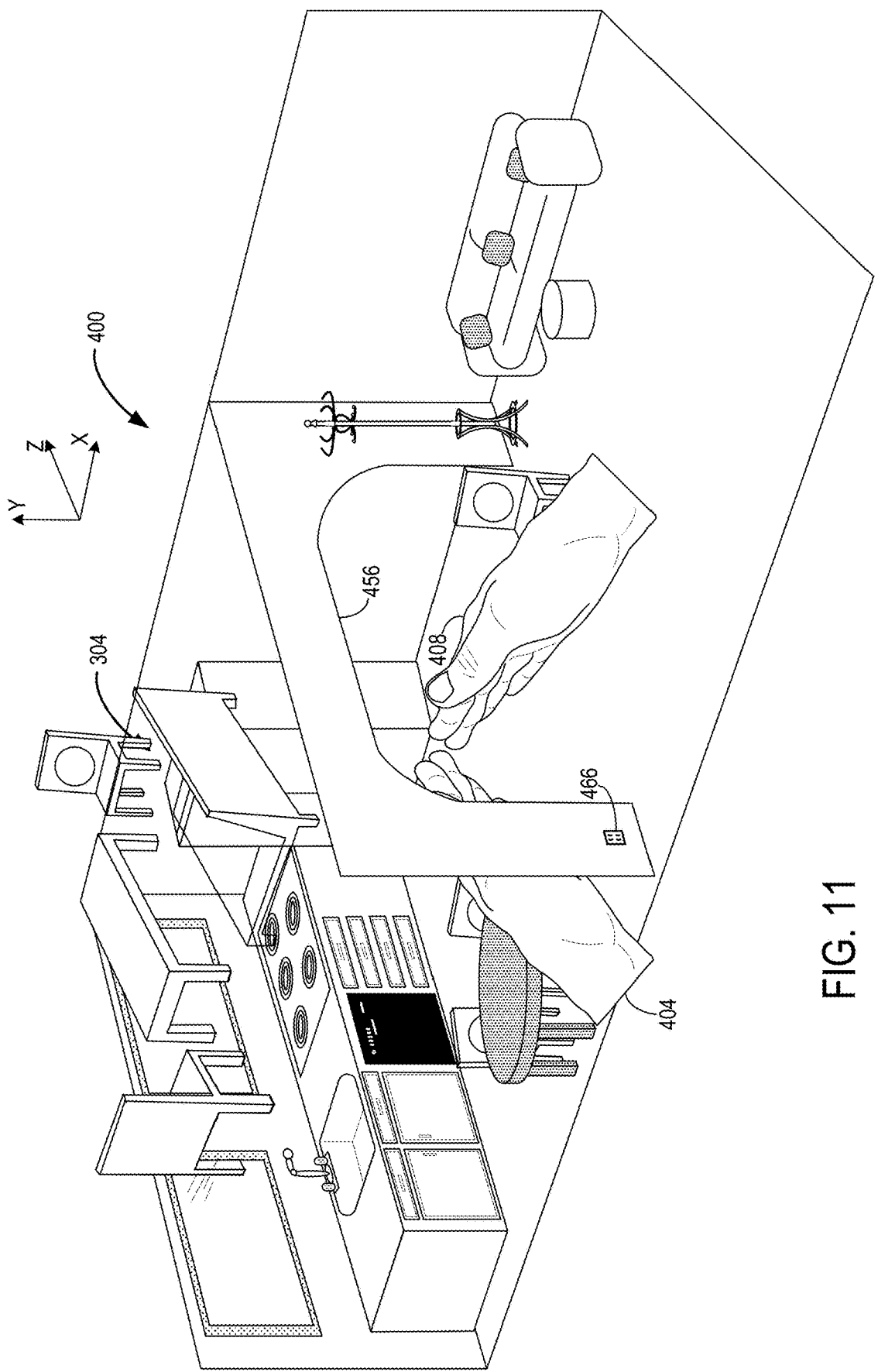

With reference to FIGS. 10-11, in some examples a user may orient his two hands to be substantially orthogonal or otherwise angled with respect to one another. In this manner, a wedge-shaped volume may be created in which previously occluded objects located within the wedge-shaped volume are revealed and displayed. In the example of FIGS. 10-11, the user forms a right angle wedge with his two hands 404 and 408, and moves the wedge within the house model 400 to selectively reveal holographic objects by moving the wedge to contain/bound those objects, such that they are between the palms of the two hands. In a similar manner, the user may move the wedge to selectively occlude different internal holographic objects when they are outside or not contained/bounded by the wedge.

As with the example described above, the two hands 404 and 408 manipulate two slicing planes (not shown) within the holographic volume of the house model 400. As noted above, each slicing plane corresponding to each hand may be located and oriented such that previously occluded holographic objects that are located in front of the palm of each hand are revealed and displayed. In the example of FIGS. 10 and 11, the user positions his hands 404 and 408 to contain the bookcase 420 (see FIG. 10) within the wedge formed by the hands, whereby the bookcase is no longer displayed and an electrical outlet 466 is revealed and now displayed on the interior wall 456.

In this example and as described in more detail below, the house model 400 may comprise multiple layers of holographic objects, with each layer of objects being selectively displayed via manipulation of a slicing plane. The bookcase 420 may be a member of a first layer of holographic objects and the interior wall 456 and outlet 466 may be a member of a second, different layer. Accordingly, in this example and as shown in FIG. 11, based on manipulation of the slicing planes corresponding to hands 404 and 408, the system ceases to display the bookcase 420 (first layer of holographic objects) and displays the second layer of holographic objects that includes the interior wall 456 and outlet 466.

With reference now to FIGS. 12-19, in some examples two hands may be utilized to manipulate two slicing planes that define a slicing volume within a holographic volume. In some examples, the slicing volume may comprise a geometric shape such as a polyhedron that may be enlarged and shrunken via movement of one or both hands of the user. As shown in these Figures and described below, in some examples the user's hand may remain outside the holographic volume and may manipulate the virtual slicing volume via one or more affordances.

As shown in the example of FIGS. 12-15, a user 500 wearing HMD 102 may use both hands to manipulate the size and shape of a cuboid volume 504 to selectively reveal previously occluded holographic objects. In this example, the user 500 triggers generation of the cuboid volume by "grasping" two outer holographic affordances 510, 514 displayed by the HMD 102 and moving them in opposing directions. Using depth image data from the HMD 102, the system may recognize each hand 512, 516 executing the "grasping" gesture interacting with the corresponding affordance 510, 514. In response to detecting the grasping gestures interacting with the affordances, the augmented reality display system 102 displays an initial slicing plane 518 through the holographic body 520. In other examples, the initial slicing plane and the cuboid volume described below may not be displayed via HMD 102.

Figure 13:
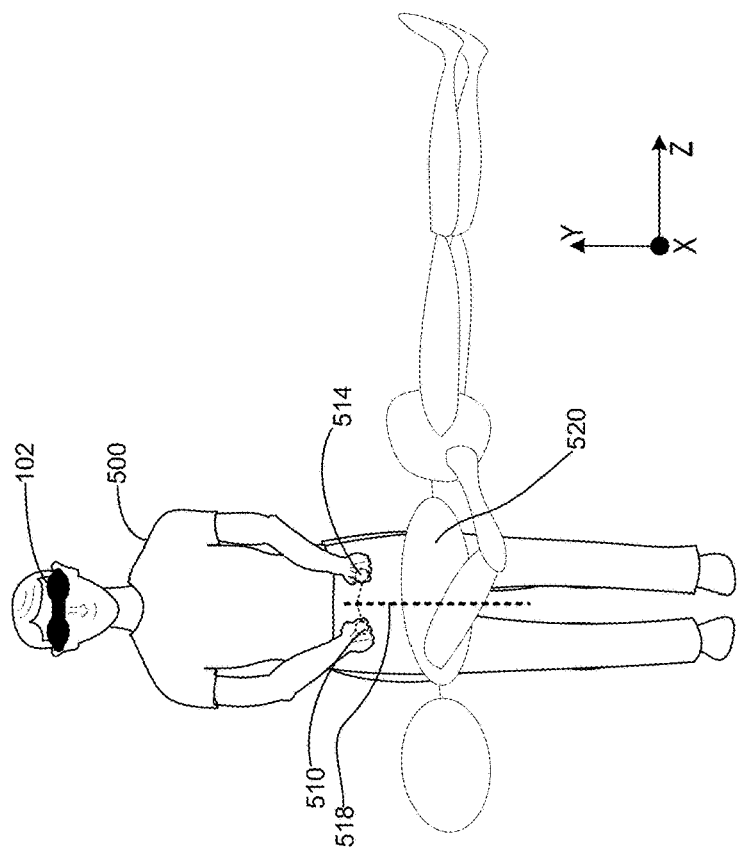
Figure 12:
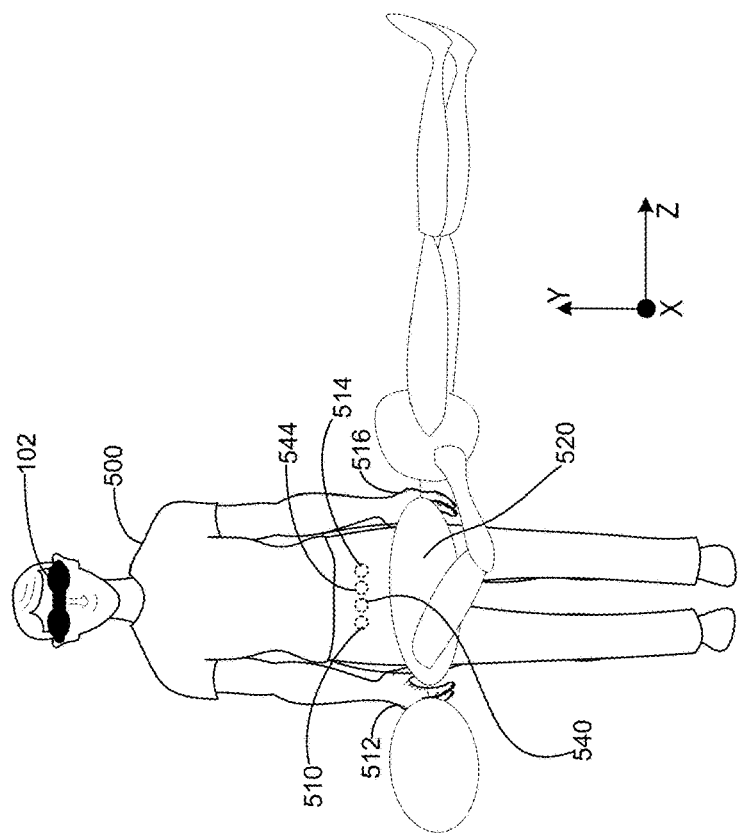

As shown in FIGS. 13-15 as the user 500 moves his hands 512, 516 apart, the cuboid volume 504 is generated and displayed and grows in volume. In some examples, the cuboid volume 504 is constrained to change size along its length in the Z-axis direction roughly parallel with the extent of the holographic body 520, such that its height and width are fixed. In other examples, both or all of its dimensions may be changed via user manipulation of the affordances 510, 514. In this example, the outer skin 556 of the body 520 is gradually "removed" (not displayed) as the rectangular end planes of the cuboid volume 504 are advanced. As shown in these figures, holographic objects internal to the body that were previously occluded and not displayed are revealed and displayed as the cuboid volume 504 expands to include/contain the objects. For example, the heart 524, veins 528 and arteries 532 are displayed in FIG. 15 but occluded and not displayed in FIG. 13.

In some examples and as noted above, a holographic volume may comprise multiple layers of holographic objects, where each layer of objects may be revealed via manipulation of a slicing plane or slicing volume as described herein. In some examples and as described below, as each sub-layer of objects is revealed and displayed, the preceding layer of objects is correspondingly removed from view. With reference to the example shown in FIGS. 16-19, in FIG. 16 the user 500 performs a release gesture interacting with the affordances 510 and 514. Based on the release gesture, the state of display of the holographic body 520 in which the heart 524, veins 528 and arteries 532 are displayed is frozen, and in this example the cuboid volume affordance is no longer displayed. In this example, the veins 528 and arteries 532 are associated with a first layer of holographic objects within the holographic body 520.

As shown in FIGS. 17-19, the user 500 next performs the grasping gesture interacting with the two inner holographic affordances 540, 544 and moving them in opposing directions. In this example, the inner affordances 540, 544 are associated with the second layer of holographic objects that includes the heart 524. As the user 500 moves his hands apart, another cuboid volume 570 is generated and grows in volume. As shown in these figures, this second layer cuboid volume 570 operates in a subtractive manner, wherein the previously displayed veins 528 and arteries 532 that are associated with the first layer of holographic objects are now removed from display when the second layer cuboid volume is expanded to include/contain these objects. In this manner, the user 500 may now more clearly see the heart 524.

Accordingly and in different examples, such as the examples of FIGS. 4-7 and 8-11, a slicing plane or slicing volume may be additive, meaning that the plane may operate to reveal and display previously occluded holographic objects. Additionally or alternatively, a slicing plane or slicing volume may be subtractive, meaning that the slicing plane/volume may operate to cease displaying or remove from view previously displayed holographic objects associated with different layers of objects, such as in the example of FIGS. 17-19 in which multiple layers of holographic objects are utilized to selectively subtract certain objects from view. In at least one embodiment, a slicing plane or volume may be additive with respect to some holographic objects and subtractive with respect to other holographic objects.

In some examples, different layers of holographic objects may be assigned to different hands of a user, such that movement of a hand operates to manipulate a subset of objects that are associated with the particular layer of objects assigned to that hand. In some examples, a developer or user may customize different layers of objects to be associated with particular hands or with particular affordances.

Figure 20:
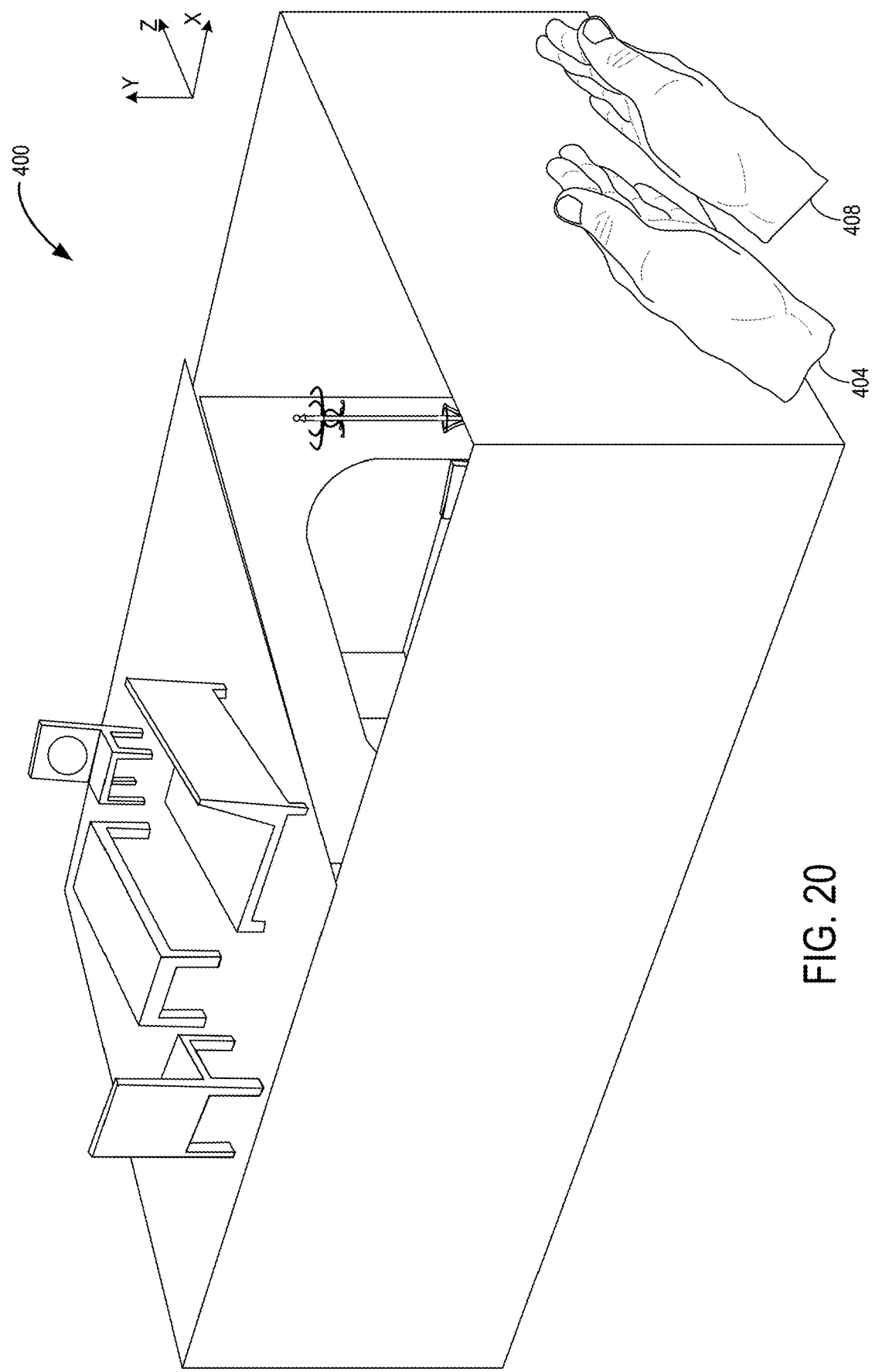
FIGS. 20-22 show examples of utilizing two hands to manipulate a slicing volume within a holographic volume according to examples of the present disclosure.
Figure 21:
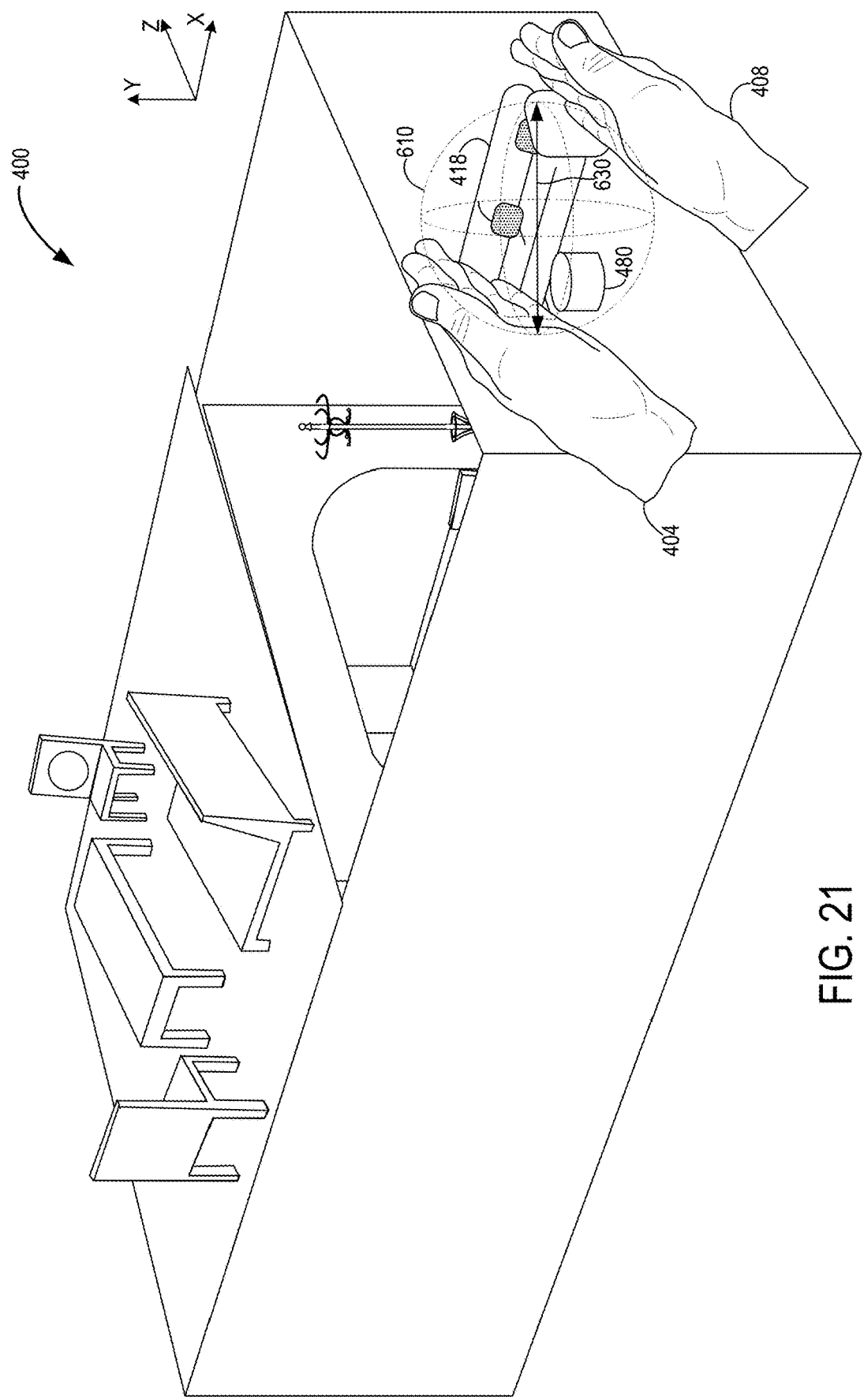

With reference now to the example of FIGS. 20 and 21, in some examples a user may use both hands to manipulate a spherical slicing volume within a holographic volume. As described below, the user may utilize his left hand 404 and right hand 408 to manipulate a spherical slicing volume within the model house 400. It will also be appreciated that a spherical slicing volume as described herein also may be utilized with a virtual reality experience in which the HMD 102 comprises a non-see-through display.

As shown in FIG. 21, when the user's hands 404, 408 extend into the displayed model house 400, a spherical slicing volume indicated at 610 is generated having a volume that corresponds to a distance between the user's hands. In some examples, the center of the spherical slicing volume 610 may be the midpoint between the user's hands. For example, a location on the palm of each hand may be tracked by the HMD 102, and the midpoint between these locations may be selected as the center of the sphere. In some examples and as shown in FIG. 21, an affordance indicating the boundary of the spherical slicing volume 610 may be displayed. For example, a glowing, translucent globe corresponding to the current shape of the spherical slicing volume may be displayed. In other examples, any suitable affordance may be displayed to indicate the spherical slicing volume.

Figure 22:
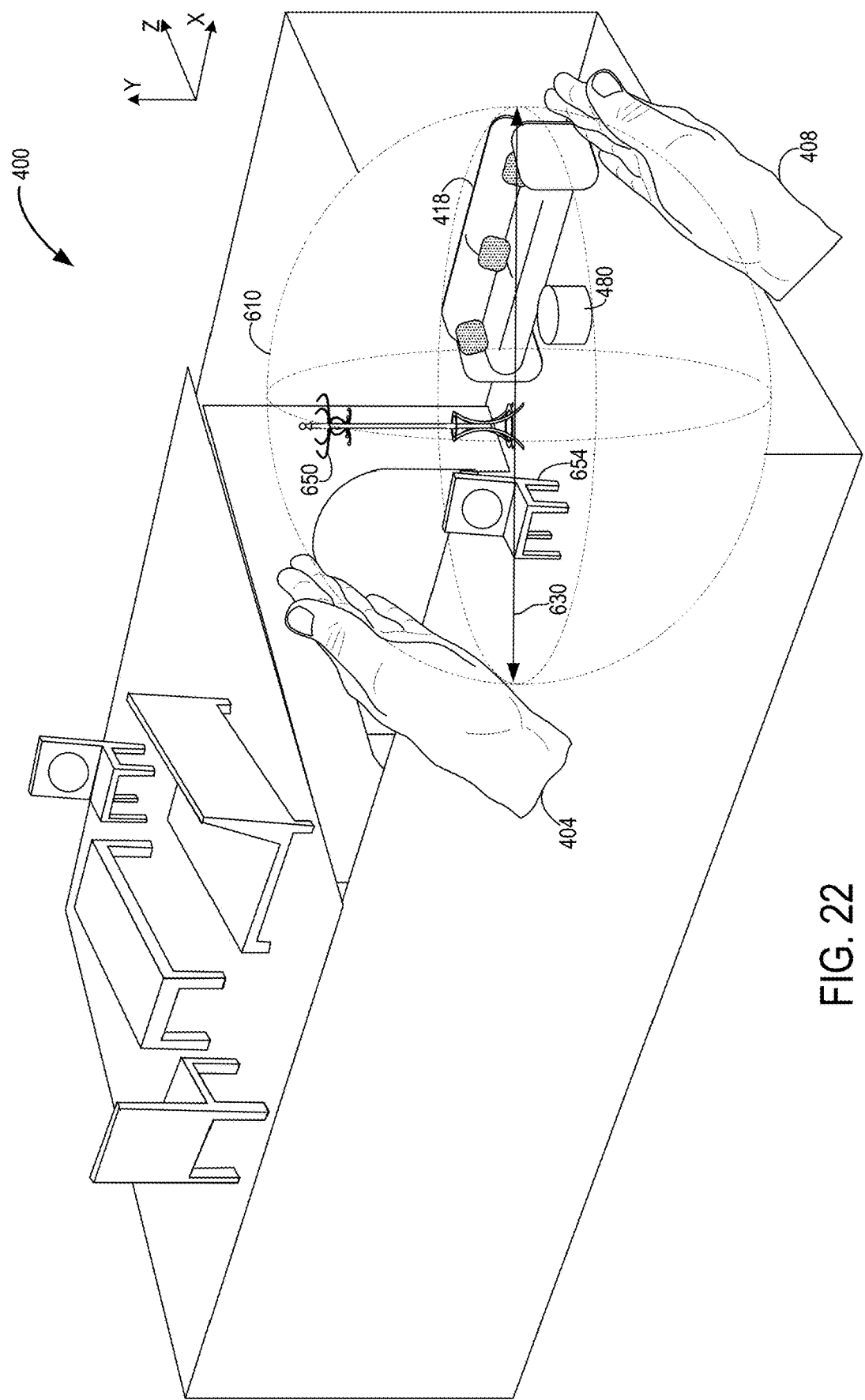

As shown in FIG. 21, within the spherical slicing volume 610 holographic objects that were previously occluded from view, such as the sofa 418 and ottoman 480, are revealed and displayed to the user. The volume of the spherical slicing volume 610 is based on the distance between tracked locations on the user's hands. When the user expands the distance between his hands, the diameter 630 of the spherical slicing volume 610 is correspondingly increased, and additional holographic objects and/or portions of such objects that were previously occluded from display are now displayed. FIG. 22 shows an example of the user expanding the distance between his hands 404, 408 to reveal additional holographic objects in the room, such as the coat rack 650 and chair 654. Correspondingly, when the user reduces the distance between his hands, the diameter 630 of the spherical slicing volume 610 is correspondingly reduced, and previously displayed holographic objects and/or portions of such objects may be occluded and/or removed from being displayed.

Accordingly, in some examples, a spherical slicing volume may be generated by receiving first location data of at least a portion of a first hand and second location data of at least a portion of a second hand. Based on the first location data and the second location data, a change in distance between the first and the second hand is determined. Based at least on the change in distance between the first hand and the second hand, at least a portion of an additional holographic object associated with the holographic volume is then displayed.

Figure 24:
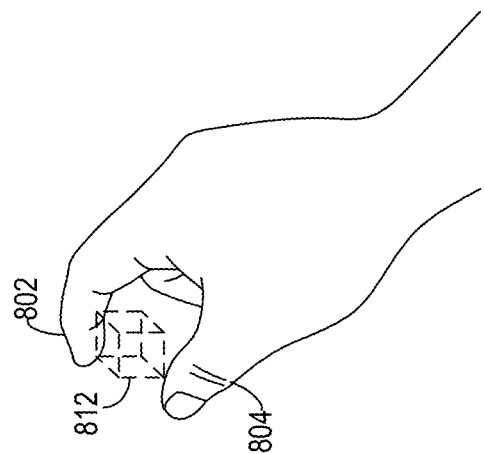
FIGS. 23 and 24 show examples of utilizing two digits of one hand to manipulate a slicing volume within a holographic volume according to examples of the present disclosure.
Figure 23:
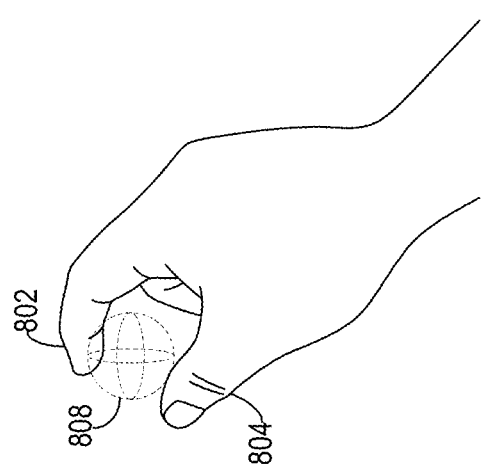

In other examples, a spherical slicing volume may be generated and manipulated via a single hand of the user. For example and with reference now to FIG. 23, a user may make a pinch gesture touching her index finger 802 to her thumb 804, then separate and expand the distance between the finger and thumb to generate a spherical slicing volume 808. As noted above, in other examples any suitable shape of slicing volume may be generated and manipulated between two hands or two digits of one hand as described herein. For example, FIG. 24 shows one example of generating and manipulating a cuboid volume 812 with one hand.

In some examples, additional data may be displayed with a slicing plane or slicing volume. For example and with a slicing plane, dimension data may be displayed that shows the distance from the plane to a designated starting point in the holographic volume or elsewhere in the environment. With reference again to FIG. 5, in one example the distance D from slicing plane 406 to the holographic interior wall may be displayed via HMD 102. In examples of a spherical slicing volume, the current volume, radius and/or diameter of the sphere may be displayed. For example and with reference to FIG. 21, the diameter 630 of the spherical slicing volume 610 may be displayed between the user's hands.

In some examples, multiple users of different HMDs may share hand tracking data and/or slicing planes/volumes based on their hand tracking data. For example, where two users of two different HMDs are viewing the same holographic volume, each device/user may have different roles/functionalities in how they manipulate the volume in an additive or subtractive manner. In one example, a first HMD and first user may manipulate a slicing plane(s) within the holographic house model 400 as describe above with reference to FIGS. 4-7 and 8-11, and the results of such manipulations may be shared with and displayed by the second HMD to the second user. Similarly, the second HMD and second user may manipulate a spherical slicing volume within the holographic house model 400 as describe above with reference to FIGS. 20-21, and the results of such manipulations may be shared with and displayed by the first HMD to the first user. It will be appreciated that many other variations and combinations of sharing slicing planes/volumes among multiple devices/users are possible and within the scope of the present disclosure.

Figure 25:
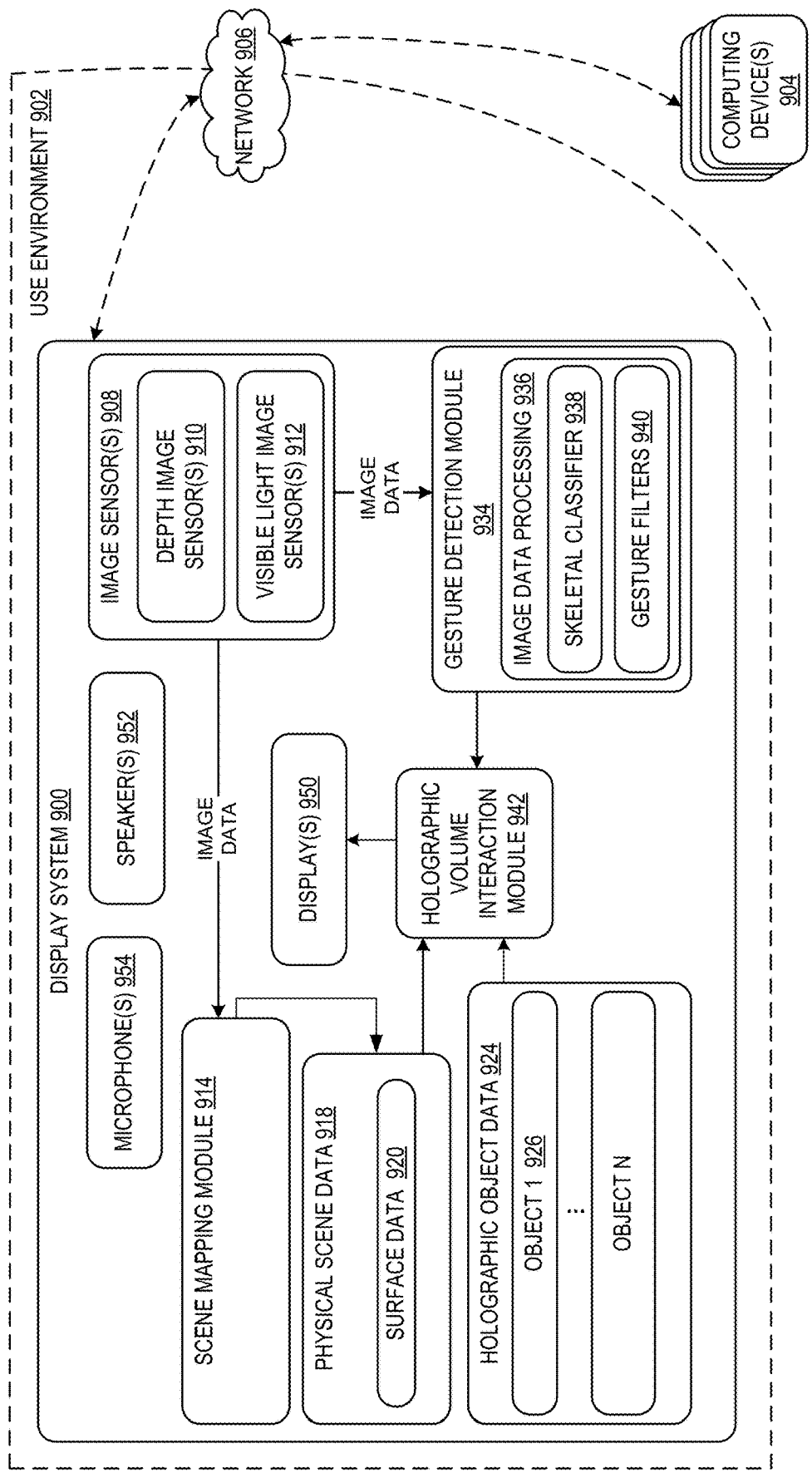
FIG. 25 schematically shows an example use environment comprising a display system that may be utilized to control the display holographic objects according to examples of the present disclosure.

FIG. 25 is a block diagram illustrating an example use environment 902 comprising a display system 900. In some examples, the display system 900 may comprise a head-mounted display device, such as the augmented reality display device 102 of FIGS. 1 through 24. In other examples, the display system 900 may comprise a virtual reality display system or a video augmented reality system. FIG. 25 illustrates example components and modules that may be used to display and manipulate slicing planes and volumes in the manners disclosed above, and omits other components for clarity. In some examples, all logic may be executed locally on the display system 900. In other examples, some logic may be executed remotely, such as by one or more remotely located computing devices 904 via a computer network 906, or by another local device (e.g. a network edge device). In different examples of display systems according to the present disclosure, one or more components and/or modules of display system 900 may be omitted, and one or more additional components and/or modules may be added.

The display system 900 may comprise one or more image sensors 908 configured to capture image data of a real-world surroundings. The one or more image sensors include a depth image sensor(s) 910 configured to capture depth image data, and optionally may include a visible light image sensor(s) 912 configured to capture visible light image data. Examples of suitable depth sensors for use as depth image sensor 910 include a time of flight camera, a depth camera, and a stereo camera arrangement. Examples of suitable visible light image sensors for use as visible light sensors 912 include an RGB camera and a grayscale camera.

The display system 900 further comprises computing hardware, such as memory and logic devices, examples of which are described below in the context of FIG. 27. Various software, firmware, and/or hardware modules may be implemented in such computing hardware. For example, the display system 900 may comprise a scene mapping module 914 configured to receive image data (depth and optionally visible light) from the one or more image sensors 908 and generate a three-dimensional surface reconstruction or other depth map of the use environment 902 based at least on the image data received.

The display system 900 may store the depth map generated by the scene mapping module 914 as physical scene data 918. The physical scene data 918 includes surface data 920. In some examples, the surface data 920 may comprise a surface reconstruction (e.g. a mesh representation of the surface), and further may comprise processed depth data in which portions of mesh data are replaced with planes corresponding to identified surfaces.

In addition to physical scene data 918, the display system 900 may store holographic object data 924 comprising information regarding holographic objects associated with applications that are executable by the display system 900. The depicted holographic object data 924 comprises data for each of one or more holographic objects, indicated as objects 1 through N. Data stored for each object 926 may comprise instructions for displaying the object, and may specify a size, a shape, a color, and/or other characteristics for displaying the object.

The display system 900 may further comprise a gesture detection module 934 configured to receive image data (depth and/or visible light) from the one or more image sensors 908 and process the image data via an image processing component 936 to detect possible user gestures. The image processing component 936 may comprise a skeletal classifier 938 configured to detect and classify an object as a skeleton or part of a skeleton. For example, the skeletal classifier 938 may fit a skeletal model to depth image data received in which a skeleton is represented by a collection of nodes that represent locations of the human body and that are connected in a form that approximates the form of the human body. In a more specific example, the skeletal classifier 938 may be configured to detect and classify a hand or other appendage(s) of a user when the appendage(s) is within a field of view of the image sensor(s) 908. In some examples, articulated hand data may be generated to represent detailed positions and orientations of a user's hand(s).

The image processing component 936 may comprise one or more gesture filters 940 configured to detect gestures performed by a user. Example gesture filters 940 include one or more filters for recognizing a user grasping gesture(s) (e.g. a grab, a pinch, etc.) and one or more filters for a user release gesture(s) (e.g., a reverse grab, reverse pinch, etc.).

The display system 900 may further comprise a holographic volume interaction module 942 configured to detect user manipulations of slicing planes and volumes described herein, as well as user interactions with displayed holographic volumes and objects that are intended to reveal and hide other holographic objects located within a holographic volume as described herein. The holographic volume interaction module 942 may receive gesture data from the gesture detection module 934, physical scene information from the physical scene data 918, and also receive holographic object data 924, e.g. regarding the locations of displayed holographic objects compared to the holographic volume and/or real-world surfaces and objects (e.g. user fingers, tables, floor, walls, etc.). Physical scene data 918 may include articulated hand location data from one or more hands, which may be used to determine the location, size, and other parameters of a slicing plane or slicing volume as described herein.

Using this data and information, the holographic volume interaction module 942 then outputs, to one or more displays 950, the holographic objects and/or portions of holographic objects described herein, including holographic objects revealed via movement and/or relocation of a slicing plane or volume. The holographic volume interaction module 942 also may utilize this data and information to selectively occlude or not display certain holographic objects and/or portions of objects as a function of movement and/or relocation of a slicing plane or volume as described herein.

The one or more displays 950 may be see-through with respect to a real-world background, or may be opaque. In addition to a display(s) 950, the display system 900 may comprise one or more other output devices and/or input devices. For example, the display system 900 may include one or more speakers 952 configured to output audio, one or more microphones 954, and various other input and output devices not shown in FIG. 25.

Figure 26A:
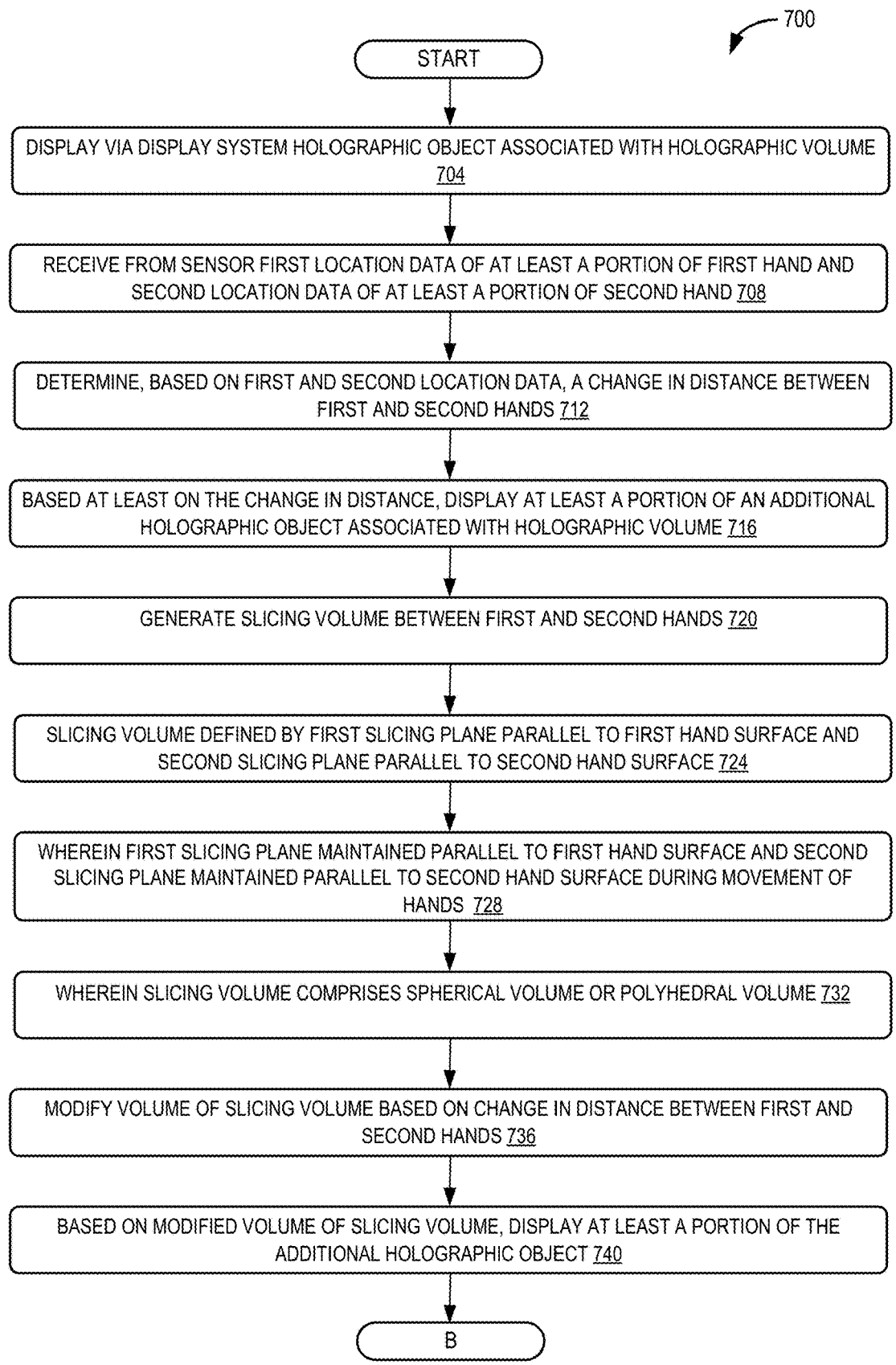
FIGS. 26A and 26B are a flowchart illustrating an example method for displaying holographic objects associated with a holographic volume according to examples of the present disclosure.
Figure 26B:
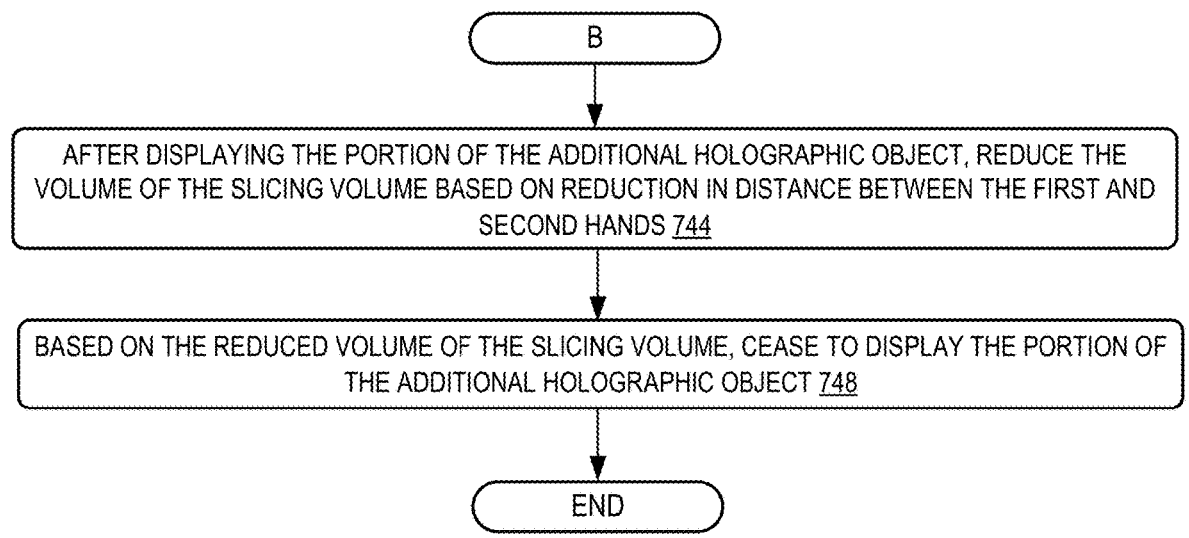

With reference now to FIGS. 26A and 26B, a flow diagram depicting an example method 700 for displaying holographic objects using a first hand and a second hand is provided. The following description of method 700 is provided with reference to the components described herein and shown in FIGS. 1-25 and 27, but it will be appreciated that method 700 also may be performed in other contexts using other suitable components.

At 704 the method 700 may include displaying via a display system a holographic object associated with a holographic volume. At 708 the method 700 may include receiving, from a sensor, first location data of at least a portion of a first hand and second location data of at least a portion of a second hand. At 712 the method 700 may include determining, based on the first location data and the second location data, a change in distance between the first hand and the second hand. At 716 the method 700 may include, based at least on the change in distance between the first hand and the second hand, displaying via the display system at least a portion of an additional holographic object associated with the holographic volume.

At 720 the method 700 may include generating a slicing volume between the first hand and the second hand. At 724 the method 700 may include, wherein the slicing volume is defined by a first slicing plane parallel to a surface of the first hand and a second slicing plane parallel to a surface of the second hand. At 728 the method 700 may include, wherein the first slicing plane is maintained parallel to the surface of the first hand and the second slicing plane is maintained parallel to the surface of the second hand during movement of the hands. At 732 the method 700 may include, wherein the slicing volume comprises a spherical volume or a polyhedral volume.

At 736 the method 700 may include modifying a volume of the slicing volume based on the change in distance between the first hand and the second hand. At 740 the method 700 may include, based on the modified volume of the slicing volume, displaying via the display system at least a portion of the additional holographic object. With reference now to FIG. 26B, at 744 the method 700 may include, after displaying via the display system the portion of the additional holographic object, reducing the volume of the slicing volume based on a reduction in distance between the first hand and the second hand. At 748 the method 700 may include, based on the reduced volume of the slicing volume, ceasing to display via the display system the portion of the additional holographic object.

In some embodiments, the methods and processes described herein may be tied to a computing system of one or more computing devices. In particular, such methods and processes may be implemented as a computer-application program or service, an application-programming interface (API), a library, and/or other computer-program product.

Figure 27:
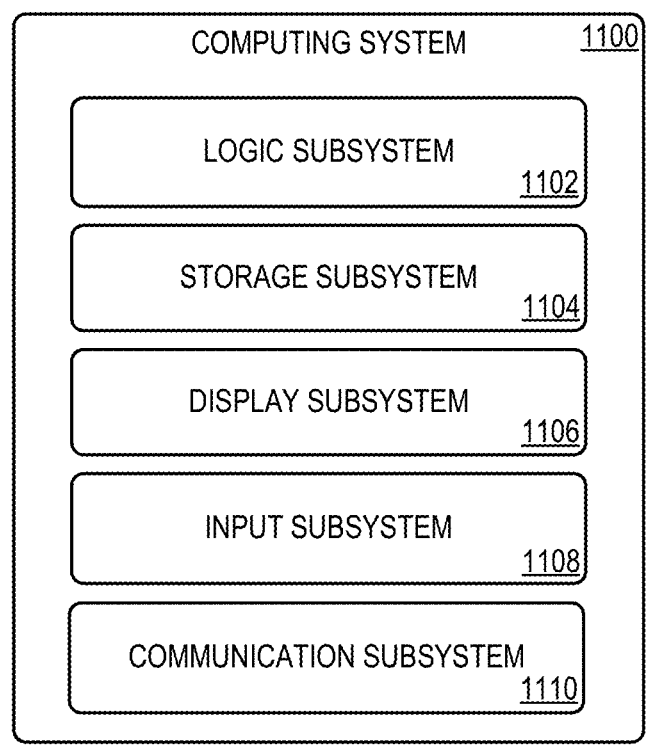
FIG. 27 is a block diagram illustrating an example computing system.

FIG. 27 schematically shows an example computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), head-mounted display devices (e.g. augmented reality display systems 102 and 900), and/or other computing devices.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1102 executing instructions held by storage machine 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Another example provides a computing device, comprising: a logic subsystem comprising a processor; and memory storing instructions executable by the logic subsystem to: display via a display system a holographic object associated with a holographic volume, the holographic object occluding an occluded holographic object that is not displayed; receive, from a sensor, location data of at least a portion of a hand; use the location data of the hand to locate a slicing plane or a slicing volume within the holographic volume; and based on the location of the slicing plane or the slicing volume, display via the display system at least a portion of the occluded holographic object. The computing device may additionally or alternatively include, wherein the instructions are executable to: use the location data of the hand to locate the slicing plane; and define a revealing direction relative to the slicing plane, wherein the occluded holographic object is displayed based on being located in the revealing direction from the slicing plane. The computing device may additionally or alternatively include, wherein the instructions are executable to locate the slicing plane substantially parallel with an upper surface of the hand. The computing device may additionally or alternatively include, wherein the instructions are executable to maintain the slicing plane substantially parallel with the upper surface of the hand during movement of the hand. The computing device may additionally or alternatively include, wherein the instructions are executable to align the slicing plane with a closest coordinate plane of three mutually orthogonal coordinate planes. The computing device may additionally or alternatively include, wherein the instructions are executable to maintain alignment of the slicing plane with the closest coordinate plane during movement of the hand. The computing device may additionally or alternatively include, wherein the location data comprises articulated hand data. The computing device may additionally or alternatively include, wherein the location data comprises articulated hand data of two digits of the hand, and the instructions are executable to: use the articulated hand data of the two digits of the hand to locate the slicing volume within the holographic volume; and based on the location of the slicing volume, display via the display system at least a portion of the occluded holographic object. The computing device may additionally or alternatively include, wherein the hand is a left hand, the slicing plane is a left hand slicing plane, and the instructions are executable to: receive, from the sensor, location data of at least a portion of a right hand; use the location data of the right hand to locate a right hand slicing plane within the holographic volume; and based on the location of the left hand slicing plane and the right hand slicing plane, display via the display system at least a portion of the occluded holographic object. The computing device may additionally or alternatively include, wherein the holographic volume comprises a plurality of layers that each comprise one or more holographic objects, and the instructions are executable to: display a first layer of a plurality holographic objects via manipulation of the slicing plane or the slicing volume; and cease displaying one or more of the plurality of holographic objects previously displayed in the first layer based on manipulation of another slicing plane or another slicing volume to display a second layer of the plurality of layers of one or more holographic objects. The computing device may additionally or alternatively include, wherein the instructions are executable to display via the display system an affordance indicating the slicing plane or the slicing volume.

Another example provides method enacted on a computing device, the method comprising: displaying via a display system a holographic object associated with a holographic volume; receiving, from a sensor, first location data of at least a portion of a first hand and second location data of at least a portion of a second hand; determining, based on the first location data and the second location data, a change in distance between the first hand and the second hand; and based at least on the change in distance between the first hand and the second hand, displaying via the display system at least a portion of an additional holographic object associated with the holographic volume. The method may additionally or alternatively include generating a slicing volume between the first hand and the second hand; modifying a volume of the slicing volume based on the change in distance between the first hand and the second hand; and based on the modified volume of the slicing volume, displaying via the display system at least a portion of the additional holographic object. The method may additionally or alternatively include, wherein the slicing volume is defined by a first slicing plane parallel to a surface of the first hand and a second slicing plane parallel to a surface of the second hand. The method may additionally or alternatively include, wherein the first slicing plane is maintained parallel to the surface of the first hand and the second slicing plane is maintained parallel to the surface of the second hand during movement of the hands. The method may additionally or alternatively include, wherein the slicing volume comprises a spherical volume or a polyhedral volume. The method may additionally or alternatively include, after displaying the portion of the additional holographic object, reducing the volume of the slicing volume based on a reduction in distance between the first hand and the second hand; and based on the reduced volume of the slicing volume, ceasing to display via the display system the portion of the additional holographic object.

Another example provides head-mounted display device, comprising: a see-through display system; a logic subsystem comprising one or more processors; and memory storing instructions executable by the logic subsystem to: display via the see-through display system a holographic object associated with a holographic volume, the holographic object occluding an occluded holographic object that is not displayed; receive, from a sensor, location data of at least a portion of a hand; use the location data of the hand to locate a slicing plane or a slicing volume within the holographic volume; and based on the location of the slicing plane or the slicing volume, display via the see-through display system at least a portion of the occluded holographic object. The head-mounted display device may additionally or alternatively include, wherein the instructions are executable to: use the location data of the hand to locate the slicing plane; and define a revealing direction relative to the slicing plane, wherein the occluded holographic object is displayed based on being located in the revealing direction from the slicing plane. The head-mounted display device may additionally or alternatively include, wherein the hand is a left hand, the slicing plane is a left hand slicing plane, and the instructions are executable to: receive, from the sensor, location data of at least a portion of a right hand; use the location data of the right hand to locate a right hand slicing plane within the holographic volume; and based on the location of the left hand slicing plane and the right hand slicing plane, display via the display system at least a portion of the occluded holographic object.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
    a logic subsystem comprising a processor; and
    memory storing instructions executable by the logic subsystem to:
        display via a display system at least a portion of a holographic object associated with a holographic volume;
        refrain from displaying at least a portion of a first occluded holographic object and at least a portion of a second occluded holographic object;
        display a first affordance for manipulating a first slicing volume;
        display a second affordance for manipulating a second slicing volume;
        receive, from a sensor, first depth image data indicating that a user is grasping and moving the first affordance;
        at least in response to the first depth image data, display the first slicing volume expanding within the holographic volume;

based on a location of the first slicing volume, display at least the portion of the first occluded holographic object and at least the portion of the second occluded holographic object;

receive, from the sensor, second depth image data indicating that the user is grasping and moving the second affordance;

at least in response to the second depth image data, display the second slicing volume expanding within the holographic volume; and based on a location of the second slicing volume, cease displaying at least the portion of the second occluded holographic object while continuing to display at least the portion of the first occluded holographic object.

2. The computing device of claim 1, wherein the instructions are further executable to, based on the location of the first slicing volume, cease displaying the portion of the holographic object.

3. The computing device of claim 1, wherein the instructions are further executable to:

display a third affordance for manipulating the first slicing volume; and prior to displaying the first slicing volume, in response to third depth image data indicating that the user is grasping the first affordance and the third affordance, display an initial slicing plane within the holographic volume.

4. The computing device of claim 3, wherein the instructions are further executable to:

detect user manipulation of the first affordance and the third affordance; and in response to detecting the user manipulation, display the first slicing volume and cease displaying the initial slicing plane.

5. The computing device of claim 4, wherein the instructions are further executable to:

receive, from the sensor, fourth depth image data indicating that the user is performing a release gesture with the first affordance and with the third affordance; and in response to detecting the release gesture, freeze a state of display of the holographic volume, the first occluded holographic object, and the second occluded holographic object.

6. The computing device of claim 5, wherein the instructions are further executable to, in response to detecting the release gesture, cease displaying the first slicing volume.

7. The computing device of claim 3, wherein the second affordance is displayed between the first affordance and the third affordance.

8. The computing device of claim 1, wherein the first slicing volume is a first cuboid volume, and the instructions are further executable to:

display the first cuboid volume growing in volume as the user moves their hands apart; and on condition that the first cuboid volume expands to include the first occluded holographic object and the second occluded holographic object, display the first occluded holographic object and the second occluded holographic object.

9. The computing device of claim 1, wherein the instructions are further executable to:

display a fourth affordance for manipulating the second slicing volume; and in response to fifth depth image data indicating that the user is grasping the second affordance and the fourth affordance, display another initial slicing plane within the holographic volume.

10. The computing device of claim 9, wherein the instructions are further executable to:

detect user manipulation of the second affordance and the fourth affordance; and in response to detecting the user manipulation, display the second slicing volume and cease displaying the another initial slicing plane.

11. The computing device of claim 1, wherein the first affordance and the second affordance are displayed outside of the holographic volume and spaced from the holographic object.

12. The computing device of claim 1, wherein the holographic object is associated with a first layer of holographic objects, the first occluded holographic object and the second occluded holographic object are associated with a second layer of holographic objects, and the instructions are further executable to:

manipulate the holographic object in response to movement of a first hand of the user; and manipulate the first occluded holographic object and the second occluded holographic object in response to movement of a second hand of the user.

13. A method enacted on a computing device, the method comprising:

displaying via a display system at least a portion of a holographic object associated with a holographic volume;

refraining from displaying at least a portion of a first occluded holographic object and at least a portion of a second occluded holographic object;

displaying a first affordance for manipulating a first slicing volume;

displaying a second affordance for manipulating a second slicing volume;

receiving, from a sensor, first depth image data indicating that a user is grasping and moving the first affordance;

at least in response to the first depth image data, displaying the first slicing volume expanding within the holographic volume;

based on a location of the first slicing volume, displaying at least the portion of the first occluded holographic object and at least the portion of the second occluded holographic object;

receiving, from the sensor, second depth image data indicating that the user is grasping and moving the second affordance;

at least in response to the second depth image data, displaying the second slicing volume expanding within the holographic volume; and based on a location of the second slicing volume, cease displaying at least the portion of the second occluded holographic object while continuing to display at least the portion of the first occluded holographic object.

14. The method of claim 13, further comprising, based on the location of the first slicing volume, cease displaying the portion of the holographic object.

15. The method of claim 13, further comprising:

displaying a third affordance for manipulating the first slicing volume; and prior to displaying the first slicing volume, in response to third depth image data indicating that the user is grasping the first affordance and the third affordance, displaying an initial slicing plane within the holographic volume.

16. The method of claim 15, further comprising:

detecting user manipulation of the first affordance and the third affordance; and in response to detecting the user manipulation, displaying the first slicing volume and cease displaying the initial slicing plane.

17. The method of claim 16, further comprising:

receiving, from the sensor, fourth depth image data indicating that the user is performing a release gesture with the first affordance and with the third affordance; and in response to detecting the release gesture, freezing a state of display of the holographic volume, the first occluded holographic object, and the second occluded holographic object.

18. The method of claim 13, wherein the first slicing volume is a first cuboid volume, the method further comprising:

displaying the first cuboid volume growing in volume as the user moves their hands apart; and on condition that the first cuboid volume expands to include the first occluded holographic object and the second occluded holographic object, displaying the first occluded holographic object and the second occluded holographic object.

19. The method of claim 18, further comprising:

displaying a fourth affordance for manipulating the second slicing volume;

detecting user manipulation of the second affordance and the fourth affordance; and in response to detecting the user manipulation, displaying the second slicing volume.

20. A head-mounted display device, comprising:

a see-through display system;

a logic subsystem comprising one or more processors; and memory storing instructions executable by the logic subsystem to:

display via the see-through display system at least a portion of a holographic object associated with a holographic volume;

refrain from displaying at least a portion of a first occluded holographic object and at least a portion of a second occluded holographic object;

display a first affordance for manipulating a first slicing volume;

display a second affordance for manipulating a second slicing volume;

receive, from a sensor, first depth image data indicating that a user is grasping and moving the first affordance;

at least in response to the first depth image data, display the first slicing volume expanding within the holographic volume;

based on a location of the first slicing volume, display at least the portion of the first occluded holographic object and at least the portion of the second occluded holographic object;

receive, from the sensor, second depth image data indicating that the user is grasping and moving the second affordance;

at least in response to the second depth image data, display the second slicing volume expanding within the holographic volume; and based on a location of the second slicing volume, cease to display at least the portion of the second occluded holographic object while continuing to display at least the portion of the first occluded holographic object.

* * * * *